(12) United States Patent
Olson et al.

(10) Patent No.: US 10,809,920 B1
(45) Date of Patent: *Oct. 20, 2020

(54) BLOCK STORE MANAGEMENT FOR REMOTE STORAGE SYSTEMS

(71) Applicant: Amazon Technologies, Inc., Seattle, WA (US)

(72) Inventors: Marc Stephen Olson, Bellevue, WA (US); Christopher Magee Greenwood, Seattle, WA (US); Anthony Nicholas Liguori, Bainbridge Island, WA (US); James Michael Thompson, Seattle, WA (US); Surya Prakash Dhoolam, Mill Creek, WA (US); Marc John Brooker, Seattle, WA (US); Danny Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,814

(22) Filed: Dec. 20, 2016

(51) Int. Cl.
*G06F 3/06* (2006.01)
*H04L 29/06* (2006.01)
*G06F 12/14* (2006.01)

(52) U.S. Cl.
CPC .......... *G06F 3/0619* (2013.01); *G06F 3/0665* (2013.01); *G06F 3/0689* (2013.01); *G06F 12/1408* (2013.01); *H04L 63/061* (2013.01); *G06F 2212/1052* (2013.01)

(58) Field of Classification Search
CPC .... G06F 3/0619; G06F 3/0665; G06F 3/0689; G06F 12/1408; G06F 2212/1052; H04L 63/061

USPC .......................................................... 713/171
See application file for complete search history.

(56) References Cited

U.S. PATENT DOCUMENTS

| | | |
|---|---|---|
| 6,701,420 B1 | 3/2004 | Hamilton et al. |
| 7,055,014 B1 | 5/2006 | Pawlowski et al. |
| 7,409,495 B1 | 8/2008 | Kekre et al. |
| 7,945,640 B1 | 5/2011 | VanTine |
| 8,087,017 B1 | 12/2011 | Whaley et al. |
| 8,442,952 B1 | 5/2013 | Armangau et al. |
| 8,650,328 B1 | 2/2014 | Chatterjee et al. |
| 8,713,356 B1 * | 4/2014 | Chan ................... G06F 11/2247 714/6.1 |
| 8,745,338 B1 | 6/2014 | Yadav et al. |
| 8,832,039 B1 | 9/2014 | Sorenson, III et al. |
| 8,832,234 B1 | 9/2014 | Brooker et al. |

(Continued)

FOREIGN PATENT DOCUMENTS

EP    2391968 B1 *  5/2018  ........... H04L 9/0625

*Primary Examiner* — Ali Shayanfar
*Assistant Examiner* — Sakinah White Taylor
(74) *Attorney, Agent, or Firm* — Davis Wright Tremaine LLP

(57) ABSTRACT

First information about regions of storage space in a storage environment available for a volume is provided to a service provider, with the storage environment being external to the service provider. The service provider is notified that information usable to locate a storage destination of a portion of the volume is unavailable. Second information that includes the storage destination in the storage environment is obtained from the service provider. A data operation is performed at the storage destination, with the storage destination determined based at least in part from the second information.

20 Claims, 20 Drawing Sheets

(56) References Cited

U.S. PATENT DOCUMENTS

| | | |
|---|---|---|
| 8,868,882 B2 | 10/2014 | Ali et al. |
| 8,935,203 B1 | 1/2015 | Brooker et al. |
| 9,256,467 B1 * | 2/2016 | Singh .................... G06F 9/5055 |
| 9,531,809 B1 | 12/2016 | Brooker et al. |
| 9,652,487 B1 * | 5/2017 | Patiejunas ......... G06F 17/30371 |
| 9,703,789 B2 | 7/2017 | Bowman et al. |
| 9,727,273 B1 | 8/2017 | Dantkale et al. |
| 9,798,494 B2 | 10/2017 | Gensler, Jr. et al. |
| 2003/0065901 A1 | 4/2003 | Krishnamurthy |
| 2004/0044853 A1 | 3/2004 | Gibble et al. |
| 2004/0098537 A1 | 5/2004 | Serizawa |
| 2005/0097266 A1 | 5/2005 | Factor et al. |
| 2005/0102484 A1 | 5/2005 | Liu et al. |
| 2005/0235127 A1 | 10/2005 | Muthiah et al. |
| 2006/0069864 A1 | 3/2006 | Dalal et al. |
| 2006/0200677 A1 | 9/2006 | Marinescu |
| 2007/0050591 A1 | 3/2007 | Boyd et al. |
| 2007/0177739 A1 | 8/2007 | Ganguly et al. |
| 2009/0055401 A1 | 2/2009 | Mann et al. |
| 2009/0193184 A1 | 7/2009 | Yu et al. |
| 2009/0248756 A1 | 10/2009 | Akidau et al. |
| 2009/0254468 A1 | 10/2009 | Acedo et al. |
| 2009/0307461 A1 | 12/2009 | Nevarez et al. |
| 2009/0313453 A1 | 12/2009 | Stefanus et al. |
| 2009/0319749 A1 | 12/2009 | Ogihara et al. |
| 2009/0328151 A1 | 12/2009 | Tamura et al. |
| 2010/0036851 A1 | 2/2010 | Paterson-Jones et al. |
| 2010/0191779 A1 | 7/2010 | Hinrichs |
| 2010/0211737 A1 | 8/2010 | Flynn et al. |
| 2010/0306495 A1 | 12/2010 | Kumano et al. |
| 2011/0066668 A1 | 3/2011 | Guarraci |
| 2011/0119442 A1 | 5/2011 | Haines et al. |
| 2011/0271069 A1 | 11/2011 | Manmohan et al. |
| 2011/0307659 A1 | 12/2011 | Hans et al. |
| 2012/0030179 A1 | 2/2012 | Kauffman et al. |
| 2012/0150826 A1 | 6/2012 | Retnamma et al. |
| 2012/0179891 A1 | 7/2012 | Edwards et al. |
| 2012/0278382 A1 | 11/2012 | Faith et al. |
| 2012/0317379 A1 | 12/2012 | Ali et al. |
| 2012/0317392 A1 | 12/2012 | Driever et al. |
| 2013/0054520 A1 | 2/2013 | Sampathkumar |
| 2014/0122796 A1 | 5/2014 | DeKoning |
| 2014/0201129 A1 | 7/2014 | Gupta |
| 2014/0245016 A1 * | 8/2014 | Desai .................... G06F 3/0604 713/171 |
| 2015/0033224 A1 | 1/2015 | Maheshwari et al. |
| 2015/0058577 A1 | 2/2015 | Earl |
| 2015/0277791 A1 | 10/2015 | Li et al. |
| 2015/0278243 A1 * | 10/2015 | Vincent ................. G06F 16/182 707/634 |
| 2015/0286524 A1 | 10/2015 | Trantham |
| 2015/0317212 A1 | 11/2015 | Lee et al. |
| 2015/0378768 A1 | 12/2015 | Conover et al. |
| 2016/0080489 A1 | 3/2016 | Ngo |
| 2016/0239222 A1 | 8/2016 | Shetty et al. |
| 2016/0330031 A1 | 11/2016 | Dreg et al. |
| 2016/0342462 A1 | 11/2016 | Karamanolis et al. |
| 2016/0350225 A1 | 12/2016 | Podaima et al. |
| 2016/0366226 A1 | 12/2016 | Friedman et al. |
| 2017/0024409 A1 | 1/2017 | Shekhar et al. |
| 2017/0344291 A1 | 11/2017 | Sterin et al. |
| 2018/0095667 A1 * | 4/2018 | Miller .................... G06F 3/0631 |
| 2018/0095955 A1 | 4/2018 | Kuang et al. |

* cited by examiner

| Range 502 | Endpoint 504 | Offset 506 | Encryption 514 | Compression 510 | Credential 512 |
|---|---|---|---|---|---|
| 0x03EF-0x042F | IP 1 | 2 | No | Yes (LZ) | (Token) |
| 0x0810-0x08B4 | IP 2 | 1 | No | No | (Token) |
| 0x08D8-0x09A0 | IP 3 | 19 | Yes (Key) | Yes | (Token) |
| 0x09A1-0x09C0 | IP 4 | 33 | Yes | No | (Token) |
| 0x05EC-0x0780 | IP 5 | 59 | No | No | (Token) |

BLOCK STORE MANAGEMENT FOR REMOTE STORAGE SYSTEMS

CROSS REFERENCE TO RELATED APPLICATIONS

This application incorporates by reference for all purposes the full disclosure of co-pending U.S. patent application Ser. No. 15/385,800, filed concurrently herewith, entitled "BLOCK STORE MANAGEMENT USING A VIRTUAL COMPUTING SYSTEM SERVICE," co-pending U.S. patent application Ser. No. 15/385,767, filed concurrently herewith, entitled "ENABLING HOST COMPUTER SYSTEMS TO ACCESS LOGICAL VOLUMES SUPPORTED BY STORAGE NODES," co-pending U.S. patent application Ser. No. 15/385,815, filed concurrently herewith, entitled "RULE INVALIDATION FOR A BLOCK STORE MANAGEMENT SYSTEM," and co-pending U.S. patent application Ser. No. 15/385,829, filed concurrently herewith, entitled "STATELESS BLOCK STORE MANAGER VOLUME RECONSTRUCTION."

BACKGROUND

Customers of a computing resource service provider may reduce expenses and overhead by using remote program execution and remote data storage services provided by the computing resource service provider. Customer applications may be distributed over multiple virtual machine instances and computing systems. Such computing systems may be implemented by various block-level storage devices. In distributed computing environments, however, scalability and availability are complex problems to solve, especially as the number of devices involved increases. Moreover, the many distributed computer systems involve computing resources that are hosted by a variety of entities, such as customers (in their own data centers) and one or more providers. Adding to the complexity are differences in devices, such as different interfaces and, generally, differences that introduce additional factors to be taken into account when managing systems.

BRIEF DESCRIPTION OF THE DRAWINGS

Various techniques will be described with reference to the drawings, in which:

FIG. 5 illustrates an example of a representation of a rule set for accessing storage nodes in accordance with an embodiment;

DETAILED DESCRIPTION

Figure 1:
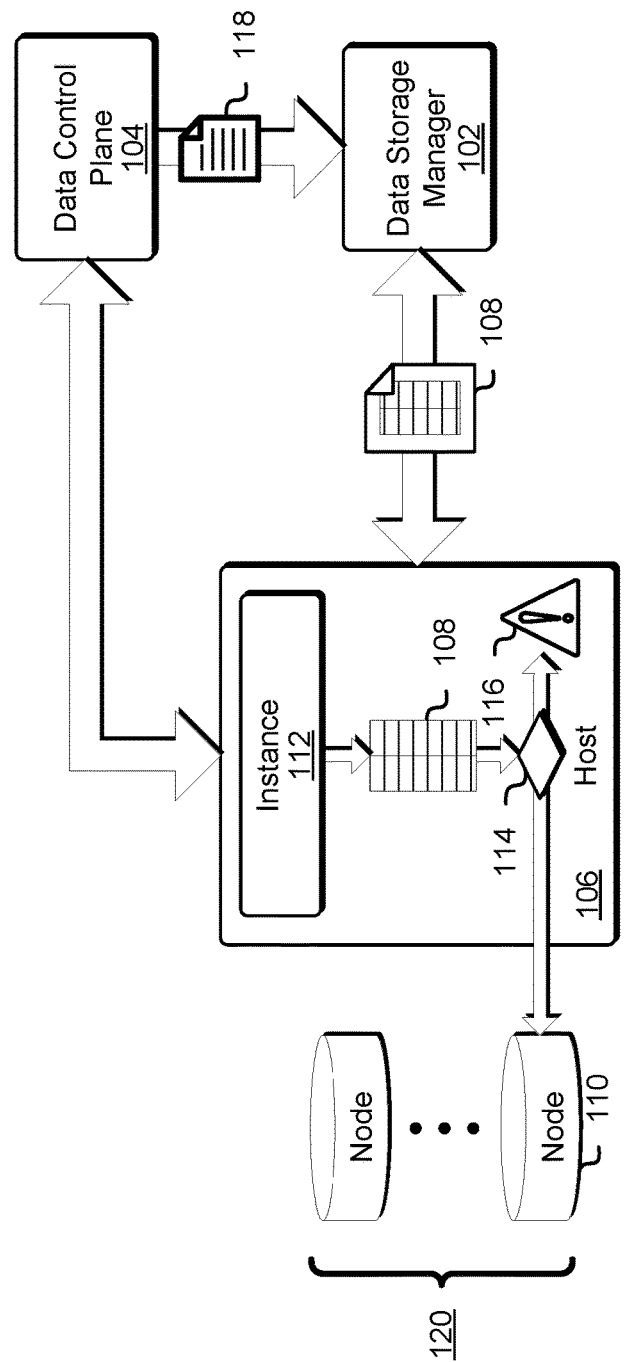
FIG. 1 illustrates an example of a logical data storage system in accordance with an embodiment.

Techniques and systems described below relate to a data storage manager that manages storage locations for blocks of a storage volume. In one example, the data storage manager maintains a set of rules that specify the locations of blocks of the logical data storage volume (also referred to as "storage volume" or just "volume" for short), and provides the set of rules to a host computing device seeking to access the blocks, thereby allowing the host computing device to access the blocks directly at the locations specified in the set of rules. In this example, the system is a service of a computing resource service provider and includes a data control plane, a data storage manager, and a host computing device. The data control plane tracks the availability of storage resources in a storage system and, upon receiving a request from the host computing device to create a volume for storage of data, determines an addressable resource pool for the volume. The addressable resource pool includes metadata specifying address ranges of available space for the volume within the storage resources.

The data control plane assigns the data storage manager to the volume and provides the addressable resource pool and the identity of the host computing device to the data storage manager. The data storage manager may be an application executing in a virtual machine instance within the computing resource service provider environment. If insufficient data storage managers are available to manage the volume, the data control plane may issue commands that instantiate a new data storage manager virtual machine to manage the volume. The volume determines, from the addressable resource pool, regions of storage space to allocate to data blocks of the volume. Note that the entire volume need not be allocated at once, but can be allocated one or more data blocks at a time to the extent they are needed by the host computing device. The volume determines a set of rules for the volume (and updates the set of rules as new blocks are allocated to the volume, as blocks are migrated between storage devices, or as updates to the addressable resource pool are received from the data control plane). The set of rules includes at least entries that map blocks of the volume to addresses (e.g., Internet Protocol addresses) where they can be found among the storage devices of the storage system. The data storage manager may provide an initial subset of the set of rules (or the entire set) to the host computing device in a response to the request to create the volume, whereupon the host computing device is able to attach the volume.

In this manner, the host computing device is enabled to communicate directly with the storage devices to obtain the blocks needed to perform read/write operations. If the host computing device seeks a block of the volume that is not referenced in its subset of rules, the host computing device notifies the data storage manager that the rule for the block it seeks is not within its local subset of rules. This notification may be made by responding to a long poll from the data storage manager with an indication (also referred to as an "exception" or "exception flag") of the type of information (e.g., which block it seeks, the type of input/output operation being performed, etc.) the host computing device lacks.

If the block sought has not yet been allocated, the data storage manager allocates the block to the volume, and, in either case, generates a rule for the block and provides the rule to the host computing device as an update to its local set of rules. The data storage manager may additionally provide additional rules for blocks it determines (e.g., via a predictive algorithm) likely to be sought by the host computing device within a certain period of time. Once the host computing device has the updated set of rules, it can communicate directly with the storage devices to perform read/write operations to the particular block or blocks it sought.

In some examples, the data storage manager also maintains a set of rules for storage volumes located on the customer's premises or some other location external to the computing environment of the computing resource service provider that provides the data storage manager. In these examples, a software agent, supplied by the computing resource service provider, provides information (addressable resource pool) about the customer's storage resources to the data control plane of the computing resource service provider. In these examples, the data storage manager is located within the computing resource service provider environment and communicates with the application servers of the customer through a network such as the Internet.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, specifically the field of persistent data storage, by separating data storage management from physical servers hosting the devices upon which data is stored in a fault-tolerant and scalable manner. Additionally, techniques described and suggested in the present disclosure improve the performance of a computing system that utilizes block-level storage by allowing the computer system to perform, using locally cached storage locations in a set of rules, input/output operations with nodes of a storage volume directly without going through an intermediary server. Furthermore, the techniques described and suggested provide the benefit that, as software updates are developed, storage server software can be updated independently from the data path without impacting data. Still another benefit provided by the techniques described and suggested is fault tolerance, because if a data storage manager for a volume is rendered unavailable (e.g., through a power event, hardware failure, or other unexpected event) another data storage manager can be assigned to manage the volume with minimal delay. Moreover, techniques described and suggested in the present disclosure are necessarily rooted in computer technology in order to overcome problems specifically arising with block-level storage volumes by allowing storage volumes to be scaled across multiple block-level storage devices.

FIG. 1 illustrates an example embodiment 100 of the present disclosure. As illustrated in FIG. 1, the example embodiment 100 may include a data storage manager 102 that receives metadata 118 about a logical data storage volume 120 from a data control plane 104. The data storage manager 102 can generate a set of rules 108 that provide a map for a host 106 of a computing instance 112 that maps locations of blocks of data to storage nodes, such as the storage node 110, that comprise the logical data storage volume 120.

In some examples, a block (also referred to as "data block") may be an addressable region in a block-level storage device. The address where the addressable region in the block-level storage device can be individually located is referred to in the present disclosure as a "block address." The host 106 can communicate with the block-level storage device according to a non-proprietary protocol, such as a small computer command interface (SCSI) protocol (e.g., SCSI-3). Commands of the non-proprietary protocol may be embedded to enable transport of the commands over various media (e.g., SCSI over Internet Protocol (IP), fiber channel protocol (FCP)).

For certain types of commands, the non-proprietary protocol is used to replicate the commands by sending the commands over a network, such as the Internet, to a remote endpoint, such as a computer system located at the site of a customer of the computing resource service provider or in a data center of a third-party provider other than the computing resource service provider that provides the data storage manager 102. The commands of the non-proprietary protocol may be encapsulated using another protocol to enable their transfer over the network. The remote endpoint may correspond to an interface of a service that receives the commands of the non-proprietary protocol and persists data accordingly. For example, the service interacts with a data storage system (e.g., block-level storage system) to persistently and durably persist data for various computing devices and virtual machine instances.

In some examples, a "volume" may be a logical storage space within a data storage system in which data may be stored. The logical data storage volume 120 may be identified by a volume identifier. Data for the logical data storage volume 120 may reside in one physical storage device (e.g., a hard disk) or may comprise multiple partitions distributed across multiple storage devices.

The logical data storage volume 120 may be comprised of a set of storage nodes. In some examples, a "storage node" may refer to one of a set of storage devices (e.g., hard drives) usable for hosting storage volumes. Thus, a storage node may host multiple volumes, which may or may not be assigned to the same customer. For example, a first volume associated with a first customer may be comprised of blocks A, B, C, and D on storage nodes W, X, Y, and Z respectively. A second volume associated with a second customer may be comprised of blocks E, F, G, and H also on respective storage nodes W, X, Y, and Z.

The logical data storage volume 120 may be operationally attached to the computing instance 112 to serve as logical storage units (e.g., virtual drive) for the computing instance. Note, however, it is also contemplated that the logical data storage volume 120 as described in the present disclosure could alternatively be operationally connected to a physical (i.e., non-virtual) computing device. The logical data storage volume 120 may enable the persistent storage of data used/generated by an operationally attached computer system (physical or virtual). Furthermore, in some embodiments, the host 106 is a computing device that is physically located on premises of the customer or a third-party provider.

A virtual computer system service may be used by a computing resource service provider for providing computer system resources for customers. The virtual computer system service may provide such computer system resources by instantiating virtual machine instances, such as the computing instance 112 on physical hardware, such as the host 106. The data storage manager 102 itself may be comprised of one or more applications that are collectively configured to generate and maintain a table that maps blocks of data of a logical data storage volume 120 to their actual storage locations among one or more block level storage devices, such as the storage node 110. The data storage manager 102 may execute within a dedicated virtual machine instance instantiated on physical hardware (not pictured) or may execute under the operating system of a physical (non-virtual) computing device. In this manner, the number of data storage managers managing volumes can be increased or decreased by instantiating a new virtual machine instance to execute a data storage manager or de-provisioning such virtual machine instances.

The data control plane 104 may be a system comprising one or more services hosted on one or more computing devices that is configured to keep track of available and allocated space on storage nodes, such as the storage node 110. Thus, when a request to create or attach the logical data storage volume 120 with specified characteristics (e.g., size) to an instance is received by the data control plane 104 from the instance 112, the data control plane 104 determines whether the available space on the storage nodes is sufficient to support the logical data storage volume 120 with the specified characteristics and, if so, selects or instantiates the data storage manager 102 and assigns the data storage manager 102 to the logical data storage volume 120. The data control plane 104 generates the metadata 118 that describes the space available and provides it to the data storage manager 102, thereby enabling the data storage manager 102 to determine the set of rules 108 that specify read/write locations for the logical data storage volume 120. The data control plane 104 may also monitor the data storage manager 102 (or a plurality of data storage managers) and, in an event that the data storage manager 102 becomes unavailable (e.g., experiences an error, stops communicating, refuses to launch, etc.), may launch a replacement data storage manager to replace the data storage manager 102 that became unavailable.

The data storage manager 102 may maintain a set of rules for each of one or more volumes. In some implementations, the data storage manager 102 may be dedicated to a single volume. In other implementations, the data storage manager 102 may be dedicated to one or more volumes of a single customer. In still other implementations, the data storage manager 102 may be dedicated to one or more volumes of one or more customers. Furthermore, there may be one or more data control planes within the computing resource service provider environment, and each of the one or more data control planes may oversee one or more data storage managers.

Figure 20:
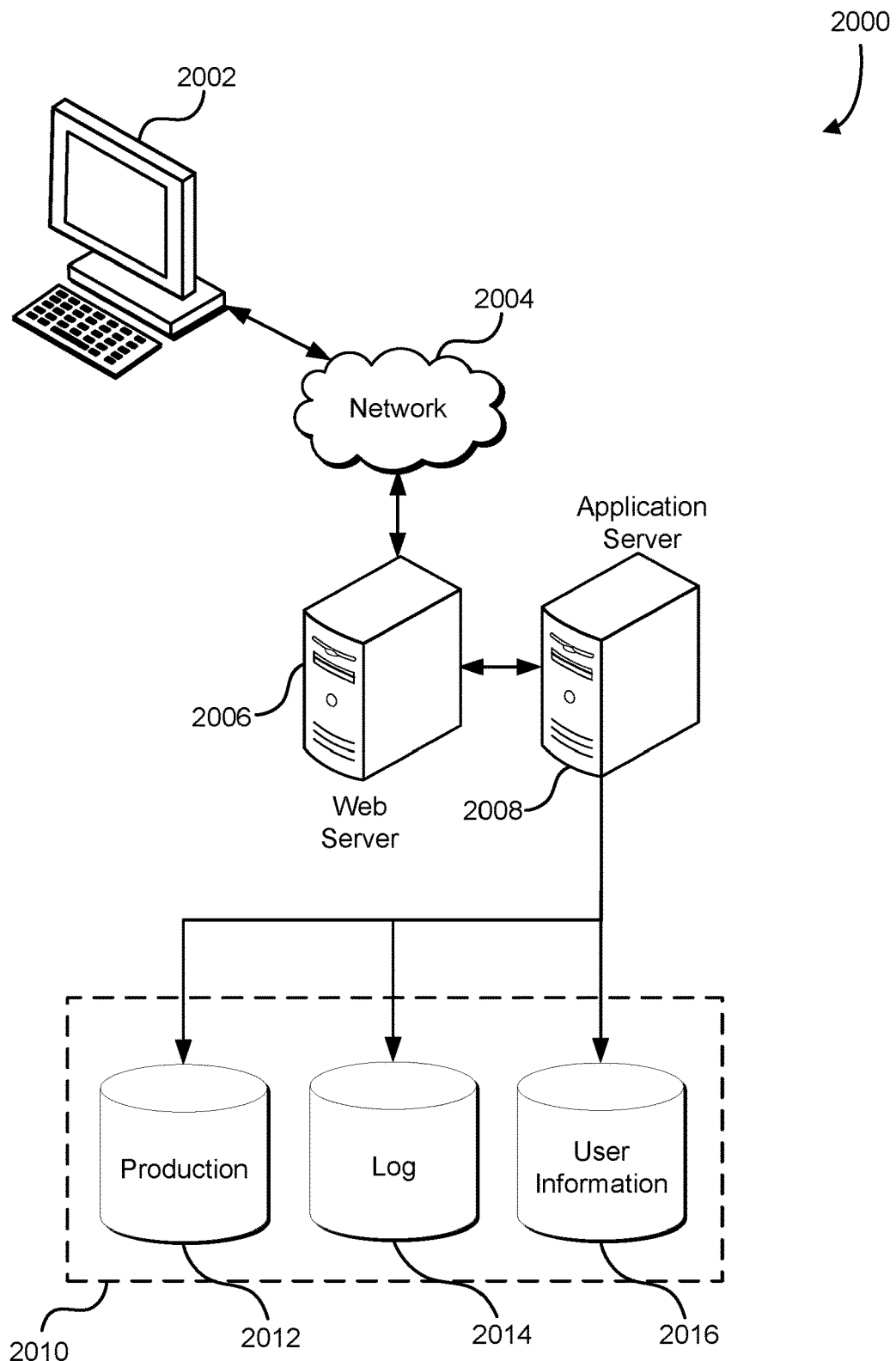
FIG. 20 illustrates an environment in which various embodiments can be implemented.

The host 106 may be any device or equipment configured to execute instructions for performing data computation, manipulation or storage tasks, such as a computer or server similar to the electronic client device 2002 and the application server 2008 described in conjunction with FIG. 20. A computing resource service provider may provide a customer with access to computer systems, such as the host 106, using a service such as a virtual computer system service. A virtual computer system service may be a collection of computer resources configured to instantiate virtual machine instances, such as the computing instance 112 on behalf of the customer. The customer may interact with the virtual computer system service to provision, place and operate the computing instance 112 that is instantiated on the host 106. The computing instance 112 may be used for various purposes, such as to operate as a server supporting a website, to operate a business application or, generally, to serve as compute power for the customer. Other applications for the computing instance 112 may be to support database applications, electronic commerce applications, business applications and/or other applications.

The set of rules 108 may be one or more entries in a data table with information about a portion (e.g., a block or series of blocks) of the logical data storage volume 120. The rules in the set of rules 108 may specify, for an I/O operation corresponding to an offset and length for the logical data storage volume, an address or offset within a particular range of the logical data storage volume 120, a physical address for the I/O operation. For example, an entry in the set of rules 108 could specify for a given volume that a particular offset and length or offset range (note that an offset and length and an offset range may be cumulatively referred to as "offset range" in the present disclosure), corresponds to an IP address of the storage node 110. It is contemplated that other methods of addressing physical locations of volume blocks may be used; for example, the physical location may utilize an alphanumeric name for the storage node 110 and/or offset range (e.g., a uniform resource identifier (URI), uniform resource name (URN), uniform resource locator (URL), etc.), or other identifier. In some implementations, write operations are replicated on different nodes for redundancy (e.g., redundant array of independent disks (RAID)); in these implementations, the set of rules 108 may include locations for the redundant nodes. In some implementations, the rules for read operations are different from the rules for write operations in the set of rules 108.

A rule of the set of rules 108 may also include other information in addition to or alternative to location information. For example, a rule may include cryptographic information, such as an identifier for one or more cryptographic keys (or the keys themselves) usable to encrypt or decrypt the data at the location in the storage node 110 associated with the rule. Similarly, the rule may include credential information, compression/decompression information, or erasure encoding information for the block at the location in the storage node 110 associated with the rule. In other words, the rule may include information sufficient to enable the host 106 to access the data. As another example, the rule may be self-expiring; that is, the host 106 may seek a rule in order to determine a location for performing an I/O operation, and the rule in question may include information that indicates that, once the I/O operation has been performed, the rule cannot be used again (i.e., the rule is rendered invalid). If the host 106 subsequently seeks to use the rule again, the host 106 may need to obtain an updated (valid) rule from the data storage manager 102. In a similar manner, the rule may be self-expiring after a predetermined number of uses (e.g., expires after 10 lookups, expires after seven write operations, expires after 35 read operations, etc.), or after a certain date/time.

The storage node 110 may be a persistent storage device (e.g., hard disk drive, non-volatile random access memory, etc.) hosted by a computer system operable to manage and enable access to the persistent storage device. A given storage node 110 may be configured to host at least portions of logical data storage volumes for one or more customers. The determination 114 may be a decision point whereupon the host 106 determines whether a storage location associated with an input/output (I/O) request made by the instance 112 can be determined from the set of rules 108 currently accessible to the host 106. If the host 106 determines that the storage location is found within the set of rules 108, the host directs the I/O request to the storage node 110 that corresponds to the storage location. In this way, the instance 112 can directly read from or write to the storage node 110. However, if the host 106 determines that the storage location cannot be determined from the set of rules 108 (i.e., the storage location is not found in the set of rules), the host may raise the exception 116 to notify the data storage manager 102 that a new set of rules is sought.

The exception 116 may be a flag, or other indicator of occurrence of a condition requiring special processing, raised by the host 106 as a result of the determination 114 indicating that the storage node location for an I/O request is not present in the set of rules 108 currently accessible to the host 106. The exception 116 may be a response to a long poll made by the data storage manager 102 to the host 106. Thus, the exception 116 indicates to the data storage manager 102 that the host 106 seeks a new set of rules. Once the new set of rules is received from the data storage manager 102, the host 106 may clear the exception; that is, the host 106 may no longer assert the exception in response to a polling inquiry from the data storage manager 102, and/or may indicate to the data storage manager 102 in response to a polling inquiry that the host 106 has received the new set of rules. In other examples where the exception is an addressable memory or file location accessible/shared by both the host 106 and the data storage manager 102, clearing the exception may be resetting data at the accessible/shared location to a value that indicates that the new rules are received and no further rules are currently sought. The metadata 118 may include an addressable resource pool usable by the data storage manager 102 to determine and generate the set of rules 108. Additional information regarding addressable resource pools can be found in the description of FIG. 9.

In some implementations, the set of rules 108 may be rules for the entire logical data storage volume 120. In other implementations, the set of rules 108 may include rules for one or more portions of the volume that are frequently accessed. In various embodiments, the set of rules includes rules for portions of the volume that the data storage manager determines (e.g., according to a predictive algorithm) is likely to be accessed via the host in the near future, such as a predetermined number of sequential blocks from the block for which an I/O request has been made (i.e., read-ahead). As an example, a customer seeks to restore a machine image that has been stored on the logical data storage volume 120 over a series of data blocks of the logical data storage volume 120. The host 106 determines that the location of the first block of the machine image cannot be determined from a local set of rules and, consequently, sets the exception 116 indicating that the location for the first block of the machine image is needed. The data storage manager 102 detects that the exception 116 is set and generates the set of rules 108 that includes the first block, as well as locations for a certain number of subsequent blocks. In this manner, the host 106 can obtain the location for the first block as well as locations for subsequent blocks that comprise the machine image. In some embodiments, read I/O operations have separate entries in the set of rules 108 from write I/O operations.

In some embodiments, the set of rules 108 may be stored in hardware of the host 106, such as in a programmable application-specific integrated circuit (ASIC). In this manner, rules lookup can take advantage of the speed of hardware processing, resulting in faster lookups, possibly at a cost of more time-consuming updates to the set of rules. In some implementations, a hybrid of hardware/software may be used for the set of rules 108. For example, the host may be provided with a set of rules in hardware that the data storage manager expects will be sought by the host, but in the event that the host seeks an unexpected rule (e.g., a rule that the data storage manager did not predict that the host would have imminent need for) and throws the exception 116, the data storage manager 102 may provide the host with a software update to the set of rules 108. In other words, a rules update in software may take priority over the set of rules 108 in hardware.

Ideally, the host 106 will locate the destinations of most I/O operations in the set of rules 108 stored on the host 106 locally, since having to obtain an updated set of rules for each exception 116 can introduce latency. However, if the exception 116 is frequently thrown (e.g., a frequency exceeding a threshold), the data storage manager 102 may send a larger set of updated rules to attempt to reduce the frequency. If the exception 116 continues to be thrown excessively frequently, the data storage manager 102 may send an even larger set of updated rules, and so on. In this manner, the data storage manager 102 can self-adjust the size of the set of rules 108 in order to optimize storage performance.

Figure 2:
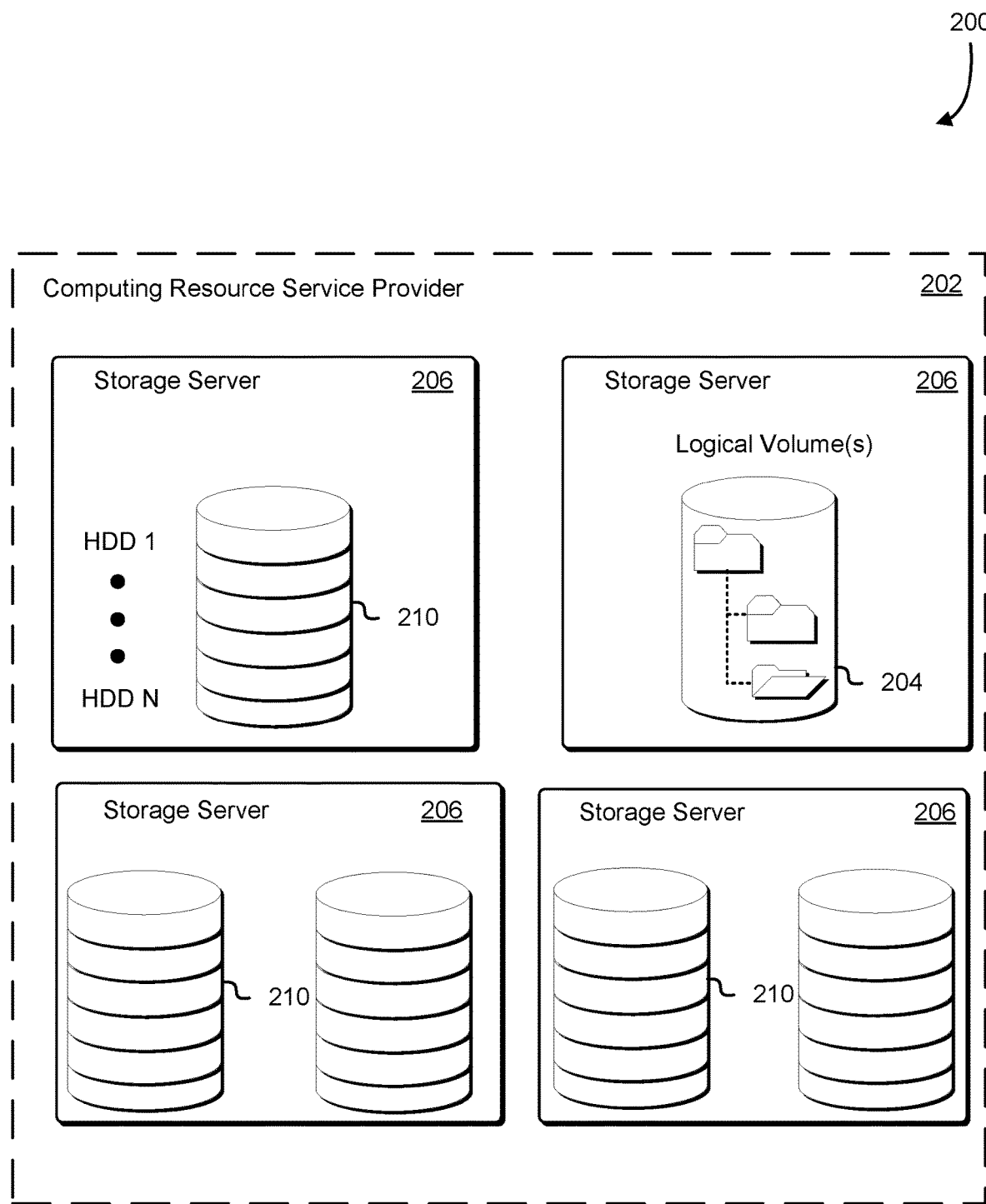
FIG. 2 illustrates an example of storage nodes in accordance with an embodiment.

FIG. 2 illustrates an example environment 200 where one or more computer systems, as well as the associated code running thereon, may provide customers with logical volumes 204 wherein the logical volume may be maintained by a computing resource service provider 202 using a storage node 206. Customer data may be stored across a variety of different data storage nodes 206 containing one or more storage devices 210 such as block-level storage devices, illustrated in FIG. 2 as HDDs1 through N 110. The customer data stored on the different devices may be exposed to a computer system operated by the customer and including a logical volume 204. Described in greater detail below, the customer may instantiate one or more virtual machines on computing resources of the computing resource service provider 202, and the one or more virtual machines may attach the exposed logical volumes 204 to enable the customer to interact with the data stored in the logical volumes 204 maintained by the remote storage service using one or more storage nodes 206. The logical volume 204 may contain one or more files which are simultaneously accessible to multiple computer systems operated by customers of the computing resource service provider 202.

As illustrated by FIG. 2 the storage nodes 206 may include a pool or other collection of storage devices 210 1 through N configured to store data on behalf of customers of the computing resource service provider 202 or other entities. The hardware configuration of the storage nodes 206 may include network interfaces, rack, switches, HDDs, solid-state drives or other storage devices, processors, memory, or any other physical component of the storage nodes 206. The software configuration of the storage nodes 206 may include logical volume placement algorithms, operating systems, hypervisors, throttling applications or other applications managing customer access to computing resources of the storage nodes 206, and any other application loaded into memory of the storage nodes 206. The storage nodes 206 may be accessible by an IP address or other network information. Example of a storage node is a network (e.g., Ethernet) attached storage (NAS) device, a storage area network (SAN) storage device, or a NAS-SAN hybrid storage device. NAS protocols include network file system (NFS), server message block/common internet file system (SMB/CIFS), and Apple filing protocol (AFP). SAN protocols include Fibre Channel, iSCSI, AT Attachment over Ethernet (AoE), and HyperSCSI.

Figure 3:
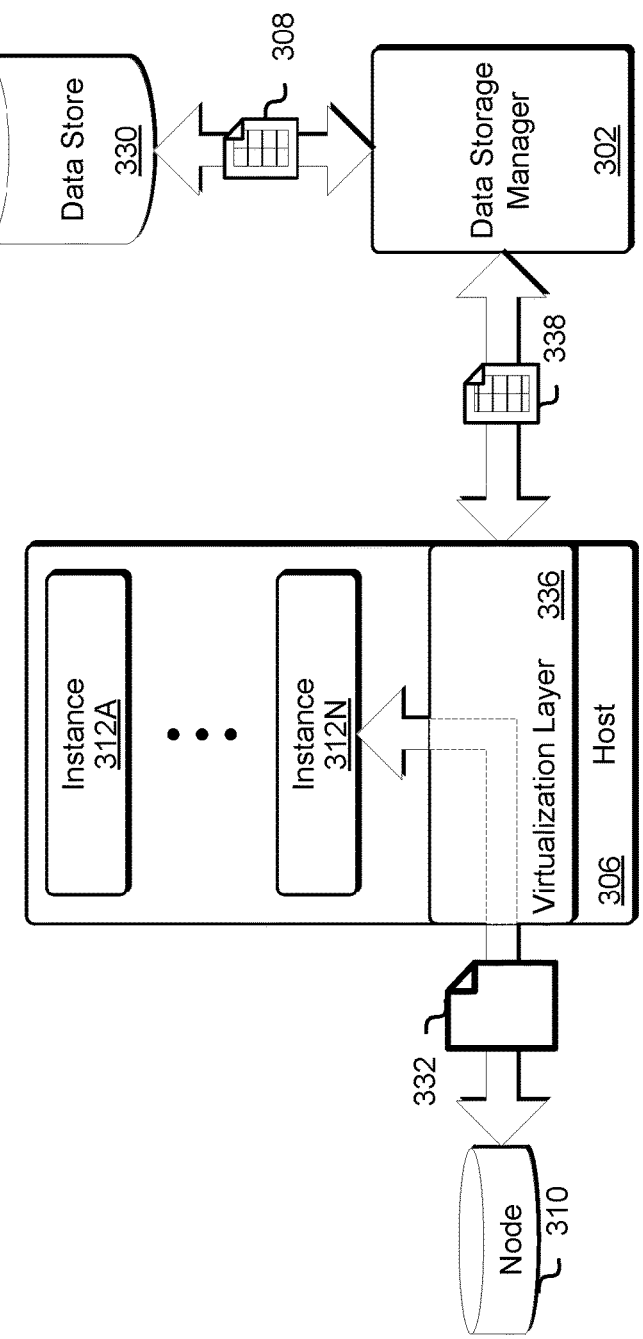
FIG. 3 illustrates an example of a relationship between a data storage manager, a host, and virtual machine instances in accordance with an embodiment.

FIG. 3 illustrates an aspect of an environment 300 in which an embodiment may be practiced. As illustrated in FIG. 3, the environment 300 may include a data storage manager 302 that stores and updates a set of rules 308 in a data store 330, and provides a subset of rules 338 from the set of rules 308 to a host 306. The host 306 may host one or more virtual machine instances 312A-12N, which may be managed via virtualization layer 336. The data storage manager 302 may communicate with the host 306 via the virtualization layer 336. The subset of rules 338 may be locally kept by the host 306 and, as an application executing in an instance of the one or more virtual machine instances 312A-12N request to perform an I/O operation via the virtualization layer 336, the host may look up a rule corresponding to the I/O operation involving the data 332 in the subset of rules 338 to determine the location (e.g., a storage node 310 and offset within the storage node 310) at which the I/O operation should be performed.

The data storage manager 302 may be similar to the data storage manager 102 of FIG. 1. The host 306 may be similar to the host 106 of FIG. 1. The storage node 310 may be a storage device similar to the storage device 110 described in relation to FIG. 1. The virtual machine instances 312A-12N may be one or more virtual machines executing applications on behalf of a customer, similar to the instance 112 of FIG. 1.

The set of rules 308 may be one or more tables at least mapping blocks of data to their locations within various storage nodes, similar to the set of rules 108 of FIG. 1. The subset of rules 338 may be a portion of the set of rules 308 that includes rules sufficient for completion of one or more I/O requests by the virtual machine instances 312A-12N, and may include additional portions of the set of rules determined by the data storage manager 302, according to a predictive scheme as described in the present disclosure, to be likely sought by the host 306 in the near future or within the next few I/O operation requests. In some of the embodiments where the set of rules 308 are maintained as a hierarchical or other tiered data structure, the data storage manager 302 formats the subset of rules 338 as a "flat" table prior to sending the subset of rules 338 to the host 306.

The virtualization layer 336 may enable the physical hardware of a host 306 to be used to provide computational resources upon which the virtual machine instances 312A-12N may operate. The virtualization layer 336 may be any device, software, or firmware used for providing a virtual computer platform for the virtual machine instances 312A-12N. An example of a virtualization layer is a hypervisor. The virtual computer platform may include various virtual computer components, such as one or more virtual processors, virtual memory, and virtual devices. The virtual machine instances 312A-12N may be provided to a customer of a computing resource service provider and the customer may run operating systems, applications and/or other such computer system entities on the virtual machine instances 312A-12N.

Figure 16:
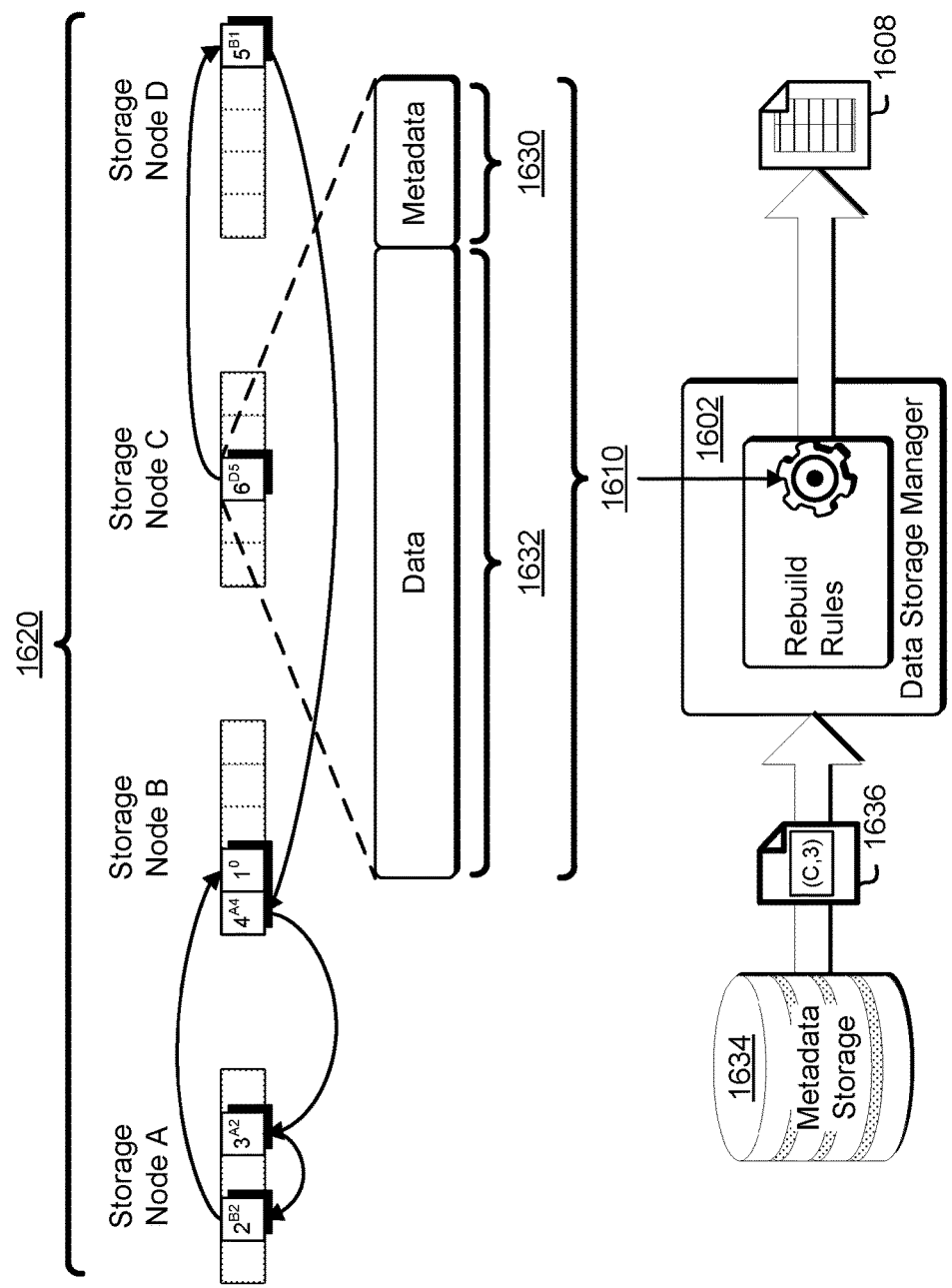
FIG. 16 illustrates an example of authoritativeness with a stateless data storage manager in accordance with an embodiment.

The data store 330 may be persistent storage that keeps a record of the set of rules 308 of the data storage manager 302. The record of the set of rules may include an original set of rules as well as differential or incremental changes from the original set of rules. Additionally or alternatively, the record of the set of rules may include an up-to-date set of rules. That is, as the data storage manager 302 updates the set of rules 308 over time, the data storage manager 302 may log the changes to the set of rules 308 in the data store 330 or store the actual updated set of rules in the data store 330. In some implementations, such as where metadata in the stored data is usable to rebuild a set of rules such as depicted in FIG. 16, the data store 330 may only store a location or identity of the youngest block of the volume. In some examples, the "youngest" block may refer to the latest block in a sequence of blocks allocated to the volume; e.g., a block with the highest operation number of the volume. This should not be confused with the most recently written-to block, which may be a block allocated earlier in time than other subsequent blocks that have been rewritten to.

The data store 330 itself may be a repository for data, such as database records, flat files, and other data. Examples of data stores include file systems, relational databases, non-relational databases, object-oriented databases, comma delimited files, and other files. In some implementations, the data store 330 is a distributed data store. In some implementations, the data store may be a metadata storage service that implements a gossip consensus protocol for durability of the metadata. In some embodiments, the data store 330 is content addressable memory or flash memory. The data 332 may be a sequence of information having a particular significance that can be stored on computer readable media. Examples of such sequence of information includes one or more portions of a flat file, database values, encrypted data, a binary large object, executable instructions, an image, and so on.

In some embodiments, a backup copy of the set of rules is maintained in memory or in persistent storage in the event that the primary set of rules becomes inaccessible (e.g., lost, corrupted, out-of-date, etc.). Likewise, in some embodiments, each data storage manager has a replica data storage manager with a most recent copy of the set of rules. In an event where the data storage manager 302 becomes nonfunctional (e.g., due to hardware or software error, loss of power, becomes nonresponsive, etc.) the replica data storage manager can be promoted to assume responsibility for managing the volume in place of the data storage manager 302. A replica of the replica data storage manager may also be created, and the original data storage manager may be terminated, deprovisioned, demoted, restarted, as appropriate.

In some embodiments of the present disclosure, information about the volume may be stored in metadata in each block (see FIG. 16). Some of these embodiments may be hybrids that also include the data storage manager 302 using the storage service to hold an up-to-date version of the set of rules 308. In an event that renders the up-to-date version unavailable (e.g., hardware failure), the data storage manager 302 or a new data storage manager may rebuild the set of rules 308 from the metadata, as in the manner described in conjunction with FIG. 16. After the set of rules 308 has been rebuilt, the set of rules 308 can be restored to the storage service once the storage service becomes available.

In the environment 300, as the one or more virtual machine instances 312A-12N make I/O requests (e.g., reading the data 332 from the storage node 310, or writing the data 332 to the storage node 310), the requests pass through the virtualization layer 336. The host 306 performs a lookup in its local copy of the subset of rules 338, and if a rule corresponding to the I/O request is found, the host 306 directs the request to the storage node 310 indicated by the rule. If the rule is not found, the virtualization layer 336 may raise an exception, as described in conjunction with FIG. 1, to indicate to the data storage manager 302 that the host 306 seeks an updated subset of rules that includes the rule sought for the I/O request. In some embodiments, the data storage manager 302 provides updated subsets of rules regularly, according to a schedule, or as a result of a change in the set of rules 308. In other embodiments, additionally or alternatively, the data storage manager 302 provides updated subsets of rules upon request (e.g., raising an exception) by the host 306.

Figure 4:
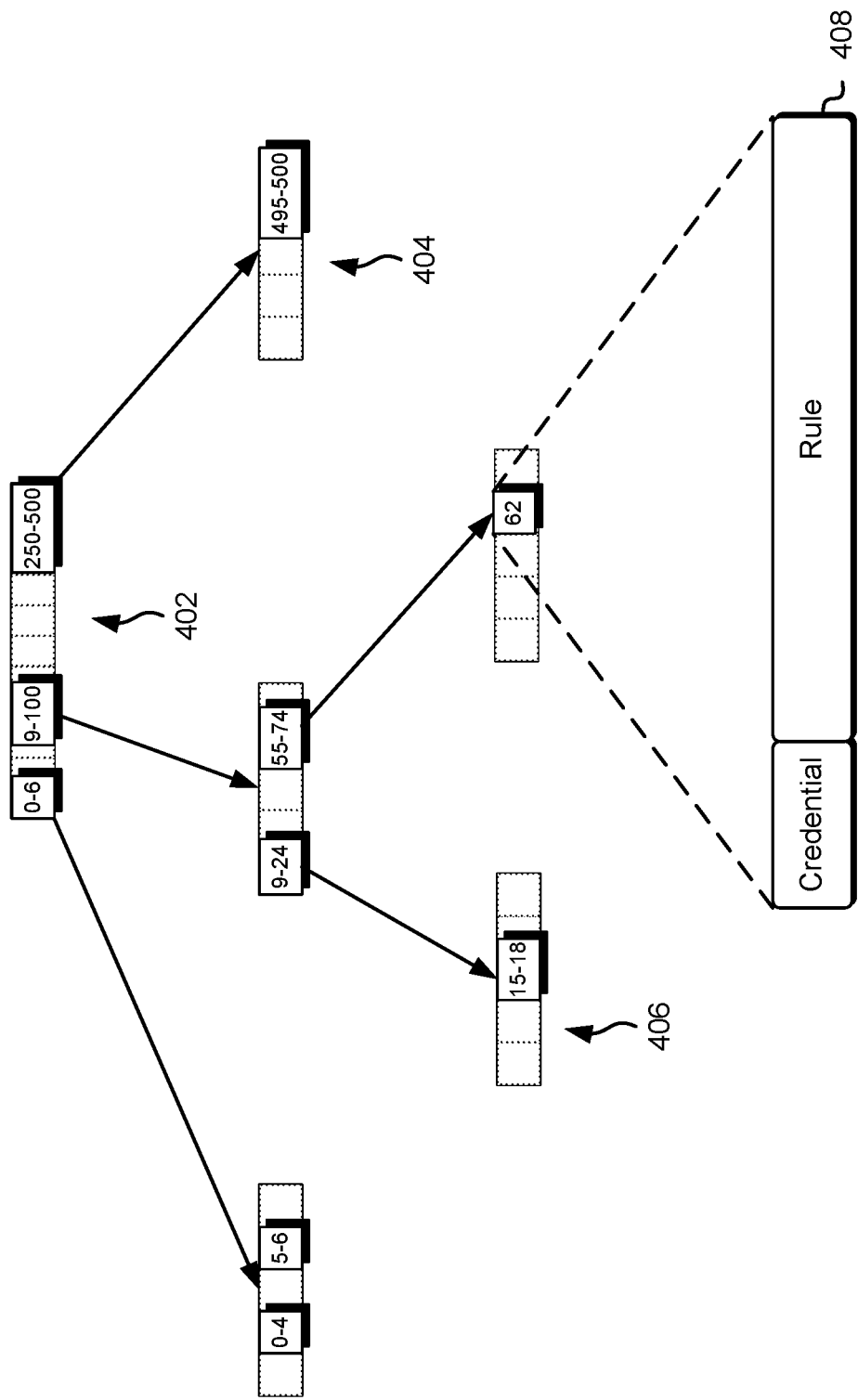
FIG. 4 illustrates an example of a representation of a rule set for accessing storage nodes in accordance with an embodiment.

FIG. 4 illustrates an example of an environment in which a set of rules may specify location information and other information associated with a set of blocks of a storage volume in accordance with an embodiment. The set of rules may be generated by a data storage manager as described above. Furthermore, the set of rules may provide information useable by a host of a computing instance to process and/or transmit storage operations to various storage nodes, such as the storage nodes that comprise a logical data storage volume as described above. Communication with the logical data storage volume may be defined by the set of rules. For example, as described in greater detail below, a particular rule 408 may include credential information and other information required by the host to communicate a storage request (e.g., I/O operations) to the storage nodes.

As illustrated in FIG. 4 the rules may be organized and/or maintained in hierarchical or tiered data structures. Examples of these hierarchical or tiered data structures include trees such as range trees, interval trees, and B-trees. In some of the embodiments where the rules are maintained as a hierarchical or other tiered data structure, the data storage manager "flattens" or otherwise formats the set of rules as a "flat" data structure such as a table prior to sending the set of rules to the host. Furthermore, these flat data structures may represent the set of rules over a plurality of data structures (e.g., multiple tables). These data structures are described in greater detail below in connection with FIG. 5. Returning to FIG. 4, a top level 402 of the data structure may indicate ranges or intervals for various portions of the logical storage volume. In addition, the top level may also indicate different logical storage volumes. For example, a plurality of logical storage volumes are connected to a particular instance and the host will use the set of rules to direct storage operations to particular logical volumes of the plurality of logical storage volumes.

The data structure containing the rules may be a sparse or dense data structure. A sparse data structure may be a data structure in which various intervals or ranges may not contain any data or other information. For example, as illustrated in FIG. 4, the data structure may contain data corresponding to the range or interval from 0 to 6 and 9 to 100 but may not contain data corresponding to the range or interval from 7 to 8. Put another way, the data structure may contain rules for various non-contiguous segments or portions of the logical volume. However, in other embodiments, the data structure is dense, meaning that the ranges or interval referenced in the data structure must be contiguous or otherwise in a defined sequence.

In addition, the data structure may be hierarchical insomuch as various levels may be considered below one or more other levels. For example, a particular range may be considered a child or leaf of another node or leaf in the data structure. As illustrated in FIG. 4, the range 250 to 500 at the top level 402 may be split into one or more other levels 404 including the range 495 to 500. This structure may allow for a more complex set of rules, such that a particular rule of the set of rules may be applied to a particular level. For example, the range 495 to 500 and other ranges within the same level of the data structure may be encrypted using a particular cryptographic key according to a particular rule associated with that level of the data structure.

In another example, when processing a request to perform an operation with the range 15 to 18 as illustrated in FIG. 4, the host may search the top level 402 and continue to the other levels 404 until the range 15 to 18 is detected. This requires the host to search the top level, a second level, and the third level. Each level may have a rule or set of rules to apply to ranges within that level. In one example, the top level 402 may include a first rule indicating a particular compression algorithm used to compress data stored in the storage locations associated with the ranges within the top level 402. The second level may include a second rule indicating a particular symmetric encryption algorithm and key used to process data stored within the storage locations associated with the ranges within the second level. The third level may include a third rule indicating the public key of a public/private key pair used to electronically sign data stored within the storage locations associated with the ranges within the third level. Therefore, in order to process a storage request for the ranges 406 15-18, the host may be required to process each rule associated with the top level, second level, and third level. In various embodiments, some or all of the processing required by the set of rules may be performed by other computing resources, such as a key management system.

In various embodiments described in greater detail below, the data structure illustrated in FIG. 4 is implemented in a combination of hardware and software. For example, various portions of the data structure may be stored in content addressable memory (CAM), a field-programmable gate array (FPGA), or other hardware device. In addition, the hardware device may be virtualized, all or in part, by the host or component thereof such as a hypervisor. When the data structure is implemented as a CAM, input (e.g., a range of storage locations or a particular storage location) is compared to a table of stored data, and the address of data or the data satisfying the search conditions is returned. If the input is not found, an error or exception may be returned.

The set of rules included in that data structure may be converted or otherwise used by the data storage manager to generate binary code or other executable code which may be used to process requests. The binary code or other executable code may be stored in memory of the host computer system and executed by the host to process storage requests from the computing instance. In such embodiments, the data storage manager simply transmits executable code to the host which can then be executed to determine a storage node of a logical volume attached to the computing instance responsible for processing a particular request. If no such storage node is determined or there is insufficient information to determine such a storage node, an exception may be generated as described above. As a result of detecting the exception, the data storage manager may transmit additional executable code. The additional executable code may be determined based at least in part on the operation to be performed, the particular storage node responsible for performing the operation, the host computer system, the computing instance, a customer associated with the computing instance, availability or utilization of computing resources of the host, data storage manager, or data control plane, a size of the executable instructions, a size of the logical volume, a request type associated with the operation, information included in the exception, or any other information that is suitable for determining a subset of rules of the set of rules to provide to the host.

In yet other embodiments, the rules may be provided in a data structure such as those described in connection with FIGS. 4-6. The data storage manager rather than transmitting executable code may transmit the data structure (e.g., the data containing the data structure) to the host. This may require the host to perform operations using the data structure to evaluate requests from the computing instance. For example, the host may include a module to search the data structure for rules indicating how to process the request. Turning to the example illustrated in FIG. 4, the host may receive a request from the computing instance to perform an operation at location 62 of the logical volume, the host may search the data structure, using any number of searching algorithms which may, in some embodiments, depend on the type of data structure, to locate the rule 408 associated with location 62. Furthermore, the rule may include credential information or other information sufficient to access the storage node, as described in greater detail below.

The data structure may include various representations of the set of rules associated with the logical storage volume. As described above, the rules may specify conditions, operations, and other information utilized by the host to determine the storage node and network address for accessing the storage node. Furthermore, the set of rules and/or data structure may also be a range or portion of the storage node to access. For example, the computing instance transmits to the host a read operation corresponding to blocks 9 to 24 of the logical storage volume. The host may then utilize the data structure to search for a rule of the set of rules associated with blocks 9 to 24. The rule may indicate a network address of a storage node and particular ranges or portions of the storage node containing the data associated with blocks 9-24 of the logical storage volume. The data structure, as illustrated in FIG. 4, may not contain all of the rules or information associated with the entire range of the logical storage volume. The data storage manager may determine an amount of the data structure and/or set of rules associated with the logical volume to provide the host. As described above, if the data structure maintained by the host does not contain a particular rule for a particular portion of the logical volume, the host may generate an exception and obtain the particular rule from the data storage manager.

Returning to FIG. 4, the rule 408 may include protocol or other information defining a mechanism for communicating with the particular storage node. For example, a separate protocol may be utilized for communicating with the storage node containing data which is accessed frequently (e.g., 'hot' data) and a storage node containing data which is accessed infrequently (e.g., 'cold' data). In addition, different types of storage nodes may utilize different communication protocols. Furthermore, the rule may indicate the read or write method utilized by the storage node. In one example, the logical volume of the computer instance is supported by two separate storage nodes, a first storage node being a Solid State Drive (SSD) storage node and the second storage node being a Hard Disk Drive (HDD) storage node. The two storage nodes may be arraigned in any number of orientations; for example, the first storage node may be used as a cache, the second storage node may be a shadow copy of the first storage node (e.g., all writes to the first storage node are replicated on the second storage node), the two storage nodes may be arranged in a redundant array of independent disks (RAID), or any number of other such arrangements. In such embodiments, the rules 408 may indicate different mechanisms for communicating with the storage nodes based at least in part on the type of storage node and/or arrangement of the storage nodes. Therefore, a particular rule 408 could indicate that a particular storage node is used as a cache for another storage node.

In some situations, such as a snapshot of the computer instance or data migration, a process executed on the host may invalidate the data structure and/or rules 408 included in the data structure. As a result, the host may generate an exception when accessing the data structure and/or rules 408 that have been invalidated. The rule invalidation may be performed synchronously with the event causing the rules to be invalidated. For example, during data migration the entire data structure or only the set of rules associated with the data being migrated may be invalidated. As described in greater detail below, the data storage manager may maintain a log of changes, modifications, or operations on the storage nodes and the logical volumes supported by the storage nodes. During the process of rule invalidation, the data store managed may determine rules to invalidate and update rules to provide to the host, based at least in part on information included in the logs.

FIG. 5 illustrates an example of an environment in which a set of rules 508 may specify location information and other information associated with a set of blocks of a storage volume in accordance with an embodiment. The set of rules 508 may be generated by a data storage manager as described above. Furthermore, the set of rules 508 may provide information useable by a host of a computing instance to process and/or transmit storage operations to various storage nodes, such as the storage nodes that comprise a logical data storage volume as described above. Communication with the logical data storage volume may be defined by the set of rules 508. For example as illustrated in FIG. 5, a particular rule of the set of rules 508 may include a range 502, an endpoint 504, an offset 506, encryption information 514, compression information 510, credential information 512, and other information required by the host to communicate storage requests (e.g., I/O operations) to the storage nodes.

The range 502 may indicate particular sets of blocks or a particular location within the logical storage volume attached to the computing instance. For example, the computing instance may transmit I/O operations, including a logical block addressing (LBA) address, to the host. As described above, the host may search the set of rules 508 for a particular range or set of ranges including the LBA address. The endpoint 504 may include an address, such as a network address or IP address of the storage node hosting particular blocks or ranges of the logical volume. The endpoint 504 includes information the host may use to locate the storage nodes and direct operations to the storage nodes. The offset 506 may indicate an offset within the storage node where data is located or data is to be written. For example, the offset 506 may indicate a sector of a HDD included in the storage node.

The encryption information 514 section of the set of rules 508 may indicate whether a particular logical volume or portion thereof is encrypted. Furthermore, the encryption information 514 section of the set of rules 508 may include cryptographic information (e.g., a cryptographic key, an identifier usable to locate a stored cryptographic key, etc.) to allow the host to encrypt and decrypt data of the logical storage volume. The encryption information 514 may be symmetric and/or asymmetric encryption information. For example, the encryption information 514 may include a private key for electronically signing a storage request prior to transmission to the storage node. The encryption information 514 may also indicate a key management service responsible for maintaining the keys for the logical volume or portion of the logical volume associated with the particular range. In these embodiments, the host may request the cryptographic key from the key management service or may transmit data to the key management service to be encrypted. In some embodiments, each block of the volume may have its own encryption key or key pair, independent from encryption keys or key pairs of other blocks of the volume, for encrypting and decrypting the data of the block.

Furthermore, as illustrated by FIG. 5 the set of rules 508 may include compression information 510. The compression information 510 indicates whether the logical volume or portion of the logical volume associated with a particular range is compressed. In addition, the compression information 510 may include a particular compression algorithm used to compress the data. The set of rules 508 may also include credential information 512. The credential information 512 may include a token or similar access credential required to access the storage node or other device restricting access to the storage node. In some embodiments, the credential information 512 includes information (e.g., user name and password) which may be used to obtain a token from a point of authority or other credential management system.

As described above, the data structure representing the set of rules 508 may be a flattened or otherwise modified version of a hierarchical data structure, such as the data structure illustrated in FIG. 4. In various embodiments, the data storage manager flattens or otherwise formats the set of rules 408 as a flat data structure, such as the table illustrated in FIG. 5, prior to sending the set of rules 508 to the host. Furthermore, these flat data structures may represent the set of rules 508 over a plurality of data structures (e.g., multiple tables). As a result, the data structure representing the set of rules 508 may include multiple entries for the same range or overlapping ranges. In one example, the entire logical volume (e.g., all ranges of the logical volume) is compressed but only a portion of the volume is encrypted. Therefore, the data structure may require overlapping or multiple entries to represent the combination of rules.

In yet other embodiments, the set of rules 508 may include information corresponding to empty or uninitialized portions of the logical storage volume. This may decrease processing time for some I/O operations obtained from the computing instance. For example, if the host receives a read operation for a range of empty values (e.g., bit value of zeros), the host simply returns empty values without transmitting a request to the storage node. In another example, if the host receives a write operation to an uninitialized range, the host may return an error or queue the write operation until the range is no longer uninitialized.

Figure 6:
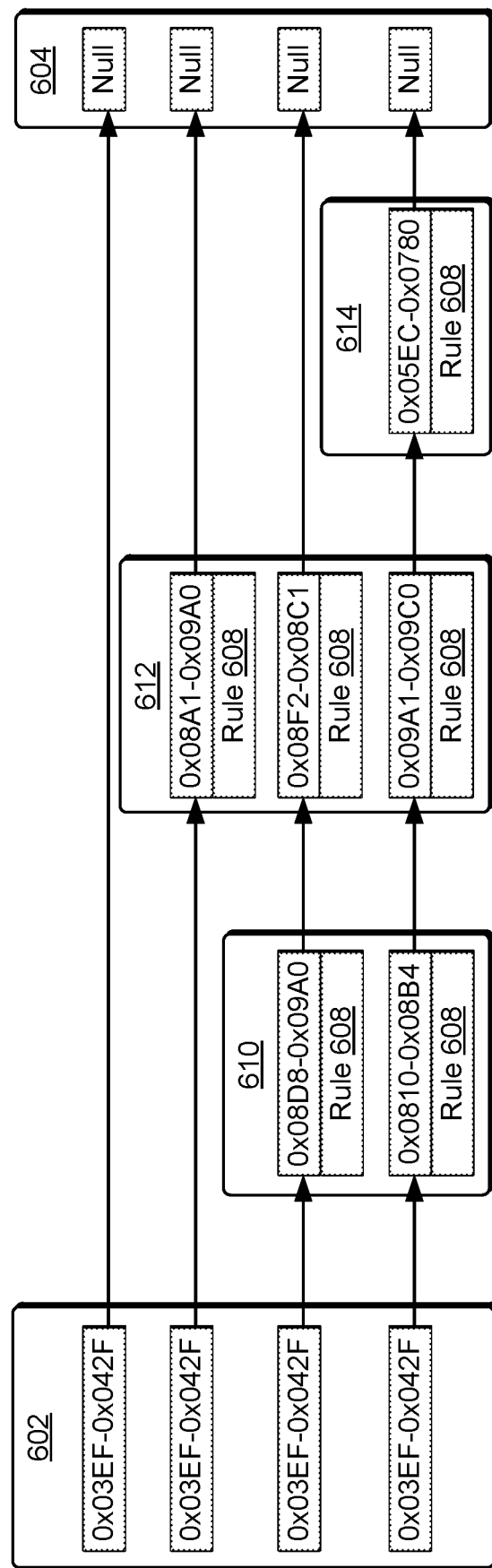
FIG. 6 illustrates an example of a representation of a rule set for accessing storage nodes in accordance with an embodiment.

FIG. 6 illustrates an example of an environment in which a set of rules 608 may specify location information and other information associated with a set of blocks of a storage volume in accordance with an embodiment. The set of rules 608 may be generated by a data storage manager as described above. Furthermore, the set of rules 608 may provide information useable by a host of a computing instance to process and/or transmit storage operations to various storage nodes, such as the storage nodes that comprise a logical data storage volume as described above. Communication with the logical data storage volume may be defined by the set of rules 608. For example, as illustrated in FIG. 6, the set of rules 608 may be organized in a skip list data structure.

The data structure illustrated in FIG. 6 includes a head 602, a first node 610, a second node 612, a third node 614, and a tail 604. Similar to the data structure illustrated in FIG. 4, the skip list data structure illustrated in FIG. 6 may be organized into a hierarchical or layered data structure. The skip list data structure may be organized into a set of linked lists. Each successive node in the skip list data structure provides a mechanism for accessing the node previous, where a rule 608 in a node i appears in node i+1 with some fixed probability p. The head 602 appears in all nodes of the skip list data structure. The skip list data structure and each node of the data structure may be a sparse subsequence. A sparse subsequence includes a set of nodes of the skip list data structure where not all elements or ranges within the set of nodes are included in the set of nodes. Furthermore, the skip list data structure may be indexed.

The data structure illustrated in FIG. 6 may also indicate empty or uninitialized data or ranges of the logical storage volume for which the host does not have a rule 608. For example, when the link in the head 602 points to the tail 604, this may indicate that the host does not contain a rule 608 for the associated range(s). Therefore, an I/O operation directed to the associated range(s) will cause the host to generate an exception. The first node 610 may indicate a subset of rules of the set of rules 608 for the range(s) included in the first node 610. In addition, hierarchical rules may be applied when particular ranges are included in multiple nodes. As described above, a first rule may be applied to a particular range of the logical storage volume, and a second rule may be applied to a sub-range within the particular range. The rules 608 may include rules as described above.

Figure 7:
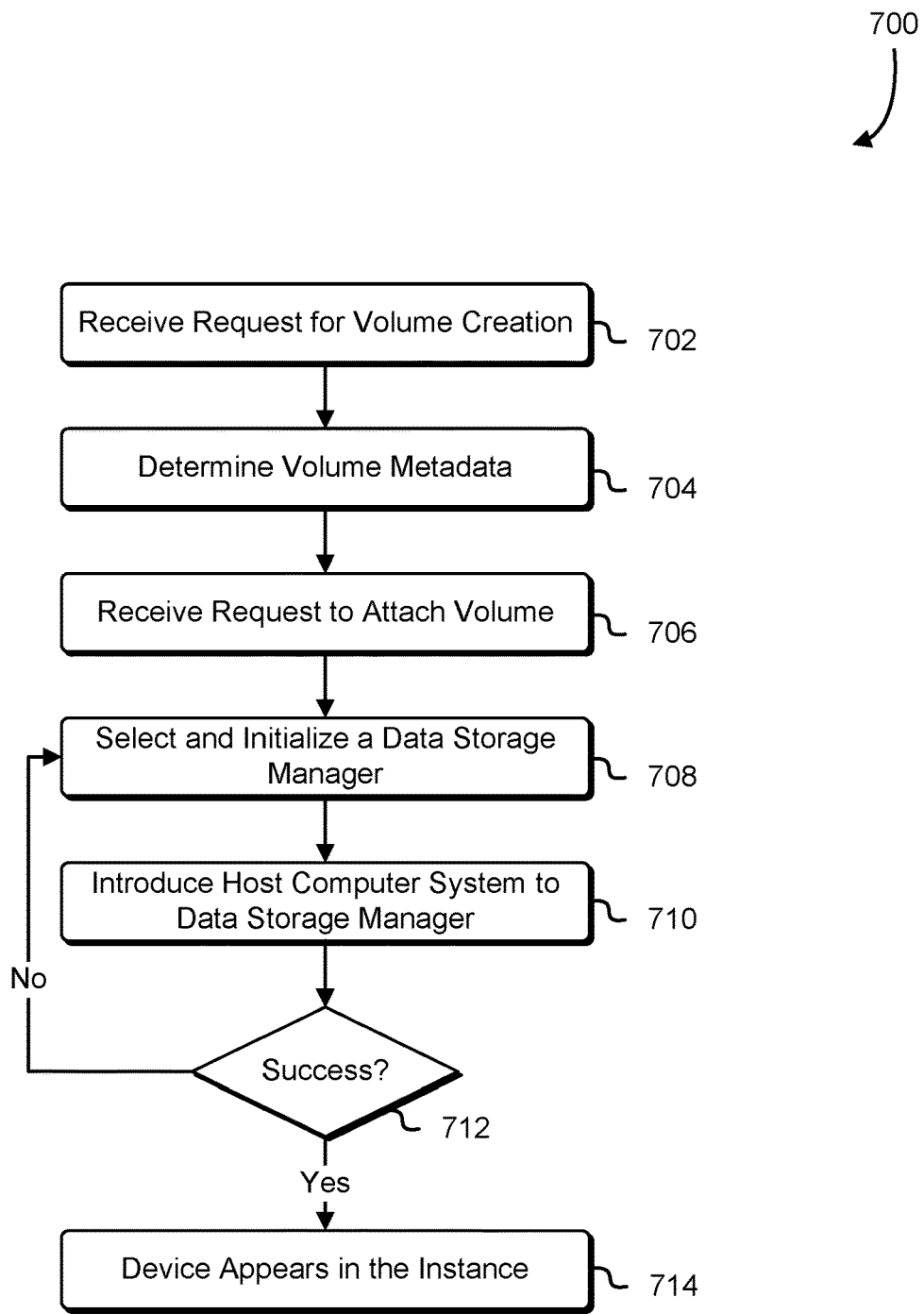
FIG. 7 is a flowchart that illustrates an example of attaching a logical data storage volume in accordance with an embodiment.

FIG. 7 is a flowchart illustrating an example of a process 700 for initializing a data storage manager for a host computing device in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by a data control plane, such as the data control plane 104 of FIG. 1. The data control plane may be implemented using any suitable system, such as a server in a data center, by various components of the environment 2000 described in conjunction with FIG. 20, such as the web server 2006 or the application server 2008, by multiple computing devices in a distributed system of a computing resource service provider, or by any electronic client device such as the electronic client device 2002. The process 700 includes a series of operations wherein a request for volume creation for a computing instance hosted on a host computer system is received from an entity associated with a customer of a computing resource service provider that provides the data control plane. The data control plane determines volume geometry (e.g., metadata about the volume, such as volume size, etc.) for the volume, initializes a data storage manager to manage the volume, and assigns the data storage manager to the host computer system.

In 702, the data control plane receives a request to provision storage for a volume of a customer of a computing resource service provider (e.g., via a createVolume( ) application programming interface call). The request may include a set of parameter values that specify characteristics of the volume to be created (e.g., volume size, number of input/output operations per second, block size, etc.). The request may be received from an entity associated with a customer of a computing resource service provider that hosts the data control plane. For example, the entity could be a computing system instance instantiated on a host computing system, such as the computing instance 112 of FIG. 1. Note that in some embodiments the host computing system is provided for use to the customer by the computing resource service provider, whereas in other embodiments the host computing system is located external to the computing resource service provider environment, such as on the customer's own premises or with a third-party computing resource service provider. The data control plane may authenticate the request in order to determine whether the requester is authorized to have the request for volume creation fulfilled.

In 704, the data control plane determines metadata (e.g., the addressable resource pool of 902 of FIG. 9) about the volume usable by a data storage manager, such as the data storage manager 102 of FIG. 1, to generate a set of rules that map storage locations for the volume. The metadata defines the geometry of the volume, such as the volume size and other metadata about the volume. In this step, the data control plane may determine whether enough storage space is available for the requested volume. For example, if one gigabyte of physical space is available, the data control plane may reject a request to create a 100 gigabyte volume. However, in some embodiments, it may not be necessary that the available space be equal to or greater than the volume size requested. For example, if 100 gigabytes of space are available, the data control plane may accept a request to create a 200 gigabyte volume because the data control plane may determine that by the time the requesting entity needs more than 100 gigabytes of space, additional gigabytes may then be available. On the other hand, the data control plane may also take into account how much space is obligated to other volumes that have not yet fully been written to. In other words, the total asset (available space) need not necessarily exceed the liability (obligated space) for new volume creation; rather, the data control plane may make its determination based on ensuring that obligated space does not exceed available space beyond a threshold proportion/percentage. Thus, the determination whether enough actual capacity is currently available to support a requested capacity may be based on a measurement derived from historical usage patterns, total obligated space, and/or one of a variety of algorithms, and the data control plane determines whether sufficient space is available for the request based at least in part on this measurement.

In some embodiments, the available resources needed for the volume are reserved and allocated by a placement service. In some of these embodiments, the placement service is a component of the data control plane, whereas in other of these embodiments the placement service is a standalone component of the overall block storage system. The placement service may be configured to reserve and allocate available space to the volume. In some embodiments, the placement service reserves and allocates available space during the operations of 704, whereas in other embodiments the placement service reserves and allocates available space after receiving the request to attach the volume in 706. In still other embodiments, the placement service reserves and allocates available space upon request by the data storage manager.

In 706, the data control plane receives a request to attach the volume to the instance (e.g., via an attachVolume( ) application programming interface call). Note that in some implementations, the request to attach the volume and the request to create are a single request; that is, the operations 702-06 of volume creation, determining volume metadata, and attaching the volume may be performed as a result of receiving a single request to create and attach the volume.

In 708, the data control plane determines/nominates a data storage manager to assign to the volume. As noted in the present disclosure, the data storage manager may generate and maintain a set of rules, such as in a table, that specify locations for reading blocks of data from and writing blocks of data to the volume. If a data storage manager is unavailable (e.g., nonresponsive, busy managing other volumes, nonexistent, etc.), the data control plane may cause a new data storage manager to be instantiated for the volume. The determination of which data storage manager should manage the volume may be made by the data control plane according to a selection algorithm that may take into consideration such factors as geographic locations of the storage nodes and the data storage managers (e.g., data storage managers in the same geographical region as the storage nodes may be weighted more favorably than data storage managers that are in a different geographical region), latency between the storage nodes of the addressable resource pool and the particular data storage manager, number of volumes the data storage manager is currently managing as compared to other concurrently running data storage managers, resource usage of the data storage managers, and identity of the customer associated with the requester (e.g., in a case where data storage managers are dedicated to volumes of a particular customer, etc.).

The data control plane may initialize the data storage manager by providing the determined/nominated data storage manager with the metadata determined in 704, from which the data storage manager can derive the set of rules for the volume. If the data storage manager determined/nominated by the data control plane is unable to serve as a manager for the volume (e.g., is unresponsive, it has experienced a failure, it is too busy, it is experiencing network latency, etc.), the data control plane may nominate or instantiate a different data storage manager to manage the volume. That is, the data control plane may select a pre-existing data storage manager and assign the volume to the data storage manager, or the data control plane may initiate the instantiation of a new virtual machine instance to run a new data storage manager to which the volume will be assigned.

In 710, the data control plane notifies the data storage manager determined in 708 of the identity of the requestor in order to provide the data storage manager with information usable by the data storage manager to provide the set of rules to the correct entity (e.g., the requestor). In this manner, the requestor need not know the identity of the data storage manager managing the volume; that is, because the data storage manager is the entity that initiates communication (e.g., long polling) with the host, if the data storage manager is replaced/substituted with a different data storage manager, the host need not be aware/notified of the replacement/substitution. Alternatively, in some implementations, the data control plane provides the requester with information for communicating with the determined data storage manager, and the requester can initiate a request for the set of rules from the data storage manager directly.

In 712, the data control plane determines whether the operations of 708-10 have been successful and, if not, may return to repeat the operations of 708 to determine a different data storage manager for the volume. Otherwise, if the data control plane determines that the operations of 708-10 have been successful, the system performing the process 700 may proceed to 714, whereupon the process may terminate. In some implementations, the operations of 714 may include providing a response to the requester that indicates that creation and attachment of the volume has been successful, whereupon the volume may appear in the storage device to the instance/requester. Note that one or more of the operations performed in 702-14 may be performed in various orders and combinations, including in parallel. For example, in some implementations, the operations of 708-10 would be performed in parallel with some or all of the operations of 702-06.

Figure 8:
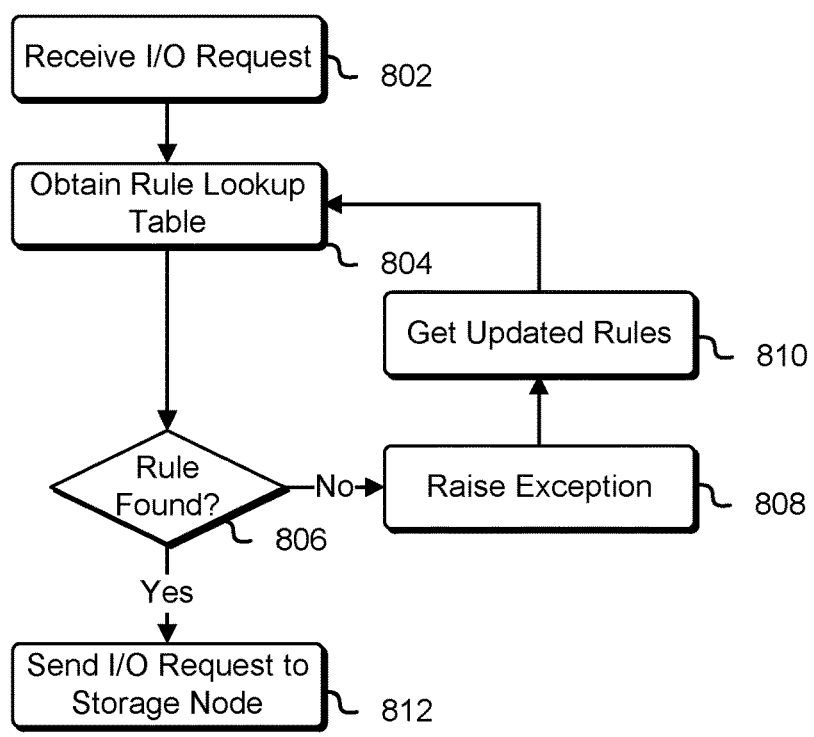
FIG. 8 is a flowchart that illustrates an example of making an input/output request to a logical data storage volume in accordance with an embodiment.

FIG. 8 is a flowchart illustrating an example of a process 800 for a host computing device in accordance with various embodiments. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 800 may be performed by a host computing system, such as a server in a data center configured to host one or more virtual machine instances, by various components of the environment 2000 described in conjunction with FIG. 20, such as the web server 2006 or the application server 2008, by multiple computing devices in a distributed system of a computing resource service provider, or by any electronic client device such as the electronic client device 2002. The process 800 includes a series of operations wherein a request is received to perform an I/O operation, an attempt is made to find the destination for the I/O operation in a local set of rules and, if not found, obtaining an updated set of rules that contains the destination.

In 802, the host computing device performing the process 800 receives a request to perform an I/O operation. The request may be received from an entity such as a virtual machine instance running on the host computing device. In 804, the host computing device obtains its local copy of a rule lookup table corresponding to the volume for which the I/O request is intended.

In 806, the host determines whether the rule lookup table contains an entry specifying the location of where the I/O operation corresponding to the request should be performed. If the rule lookup table is missing this entry, if the entry is expired in the rule lookup table, if an attempt made to perform the I/O operation to that entry found in the lookup table results in an error, or if the rule lookup table is otherwise inaccessible, the host may proceed to 808 of the process 800.

In 808, the host computing device raises a flag that indicates that an update to the local rules table is sought. In some embodiments, this involves responding to a long poll from the data storage manager with a value that indicates that a rules update is requested. In some implementations, the flag includes metadata about the I/O operation (e.g., where the operation is intended to write to, or read from, amount of read/write data, etc.) from which the data storage manager can determine which rules to provide to the host computing device.

In 810, as a result of raising the flag in 808, the host computing device receives a new rules table that should at least contain an entry that corresponds to the I/O operation of the request received in 802. Thus, the host computing device may return to 804 to perform a lookup in the new rules table for the request. Otherwise, if the host computing device finds a rule corresponding to the request received in 802 in the local rules table, in 812, the host computing device forwards the request to the storage node (e.g., the storage node 110 of FIG. 1) corresponding to the entry in the local rules table. Note that one or more of the operations performed in 802-12 may be performed in various orders and combinations, including in parallel.

Figure 9:
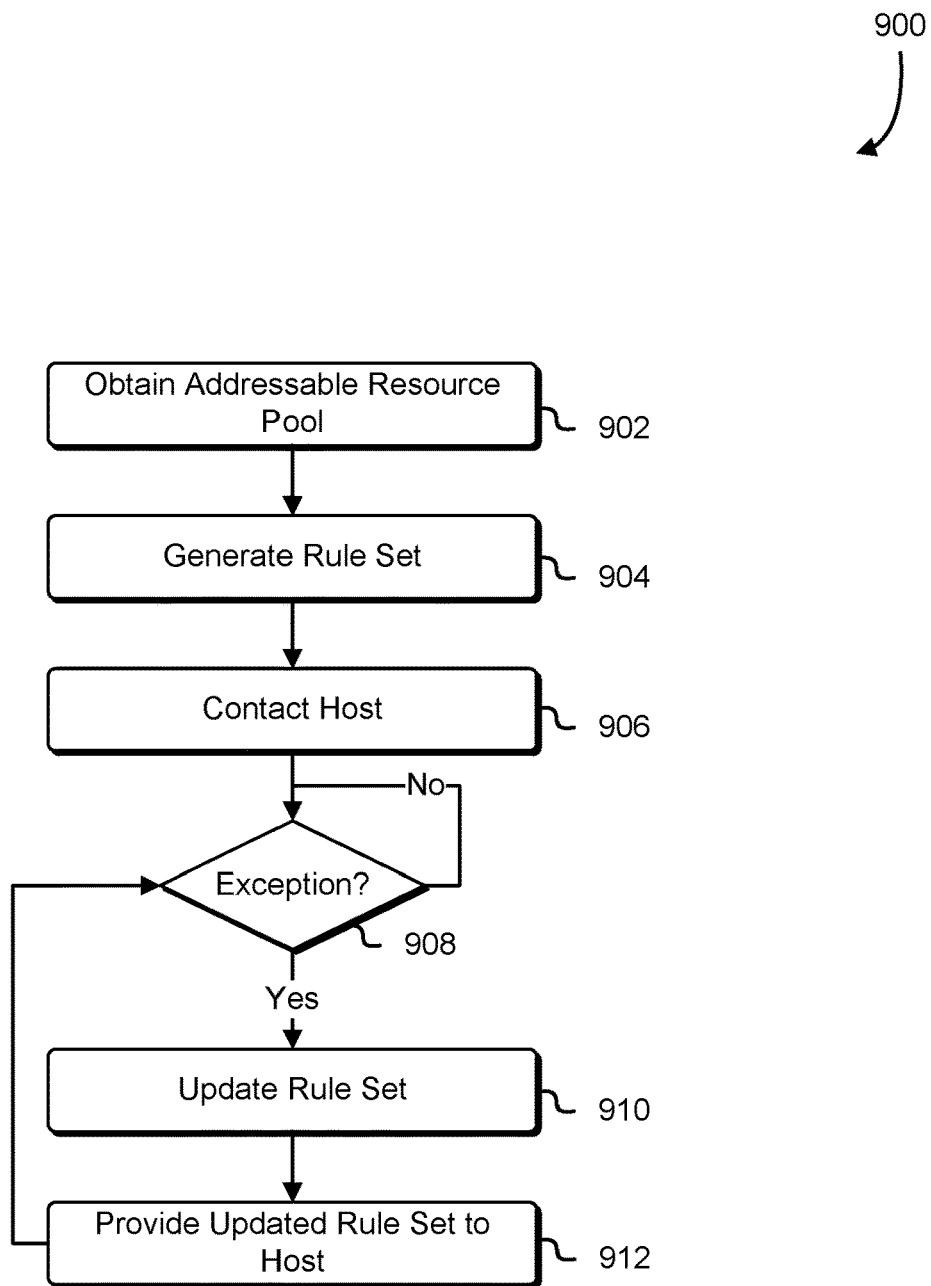
FIG. 9 is a flowchart that illustrates an example of providing rules about a logical data storage volume to a host computing device in accordance with an embodiment.

FIG. 9 is a flowchart illustrating an example of a process 900 of a data storage manager in accordance with various embodiments. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 900 may be performed by any suitable system, such as a server in a data center, by various components of the environment 2000 described in conjunction with FIG. 20, such as the web server 2006 or the application server 2008, by multiple computing devices in a distributed system of a computing resource service provider, or by any electronic client device such as the electronic client device 2002. The process 900 includes a series of operations wherein a data storage manager that was selected or caused to be instantiated by a data control plane in 1108 of FIG. 11 receives an addressable resource pool (i.e., metadata about the volume and storage resources available for use by the volume) from the data control plane. The data storage manager generates a set of rules for the volume and provides those rules to a host computing system that hosts an instance to which the volume is attached.

In 902, the data storage manager receives an addressable resource pool. The addressable resource pool may be received from the data control plane, from a placement service external to the data control plane, or from a placement service internal to the data control plane. The addressable resource pool may be a set of addresses and/or offsets, or ranges of locations in storage, that specifies the bounds of space among the storage nodes where data for the volume can be stored. The addressable resource pool may or may not be contiguous. In some examples, this set of addresses and/or offsets or ranges are referred to as an "addressable resource pool" or "addressable resource space." In addition, in the operations of 902, the data storage manager may receive an Internet Protocol address corresponding to the host of the computing instance requesting the volume or other identity usable to establish contact with such host. In some embodiments, the addressable resource pool is exclusive to the volume. In other embodiments, the addressable resource pool is not exclusive to the volume but is exclusive to volumes belonging to a single customer. In still other embodiments, the addressable resource pool is not necessarily reserved for the particular volume. For example, the data control plane may provide a first addressable resource pool and a second addressable resource pool to a first volume and a second volume respectively, and the first and second addressable resource pools may have overlapping address spaces. If the first volume claims a block from an overlapping address space, the region occupied by that block would no longer be available to the second volume. In the example, if the first volume is managed by a first data storage manager and the second volume is managed by a second data storage manager, the first data storage manager would communicate to the second data storage manager that the address range corresponding to the block should be excluded from the second addressable resource pool.

In 904, from the addressable resource pool, the data storage manager generates a set of rules for the volume. For example, the addressable resource pool may specify that the data storage manager can choose from a first storage region, a second storage region, and a third storage region for determining the set of rules that define where portions of the volume can be written. The storage regions may be at least a portion of a storage device, a portion of an on-demand data storage service, a portion of memory, or other types of storage areas known in the art. The data storage manager then determines, according to a placement algorithm (e.g., best fit, best performance, pseudorandom, etc.), which of these storage regions to use for I/O as it generates the rules. Eventually, as more of the addressable resource pool is claimed by this and possibly other volumes, the addressable resource pool may become exhausted (i.e., may run low on available space). In such cases, the data storage manager may request a new or updated addressable resource pool from the data control plane.

As an example, the data storage manager may receive, included with the addressable resource pool, a list of storage nodes with available space, address ranges of the available spaces on the storage nodes, and the volume size. As noted in the present disclosure, the set of rules specifies at least storage locations, such as the storage node 110 of FIG. 1, where blocks of data for the volume can be read from or written to. As an example, the data storage manager receives from the data control plane information that specifies that the volume is to have 12 blocks and that storage node A has available space within block addresses 10-12 and 25-27, storage node B has available space within block addresses 05-09, and storage node C has available space within block addresses 02-10, 16, and 27-32. The data storage manager may generate a set of rules for the volume that looks something like:

| Volume Block | Location |
|---|---|
| 00 | store.example.com/SNA/10 |
| 01 | store.example.com/SNA/11 |
| 02 | store.example.com/SNA/12 |
| 03 | store.example.com/SNA/25 |
| 04 | store.example.com/SNA/26 |
| 05 | store.example.com/SNA/27 |
| 06 | store.example.com/SNB/05 |
| 07 | store.example.com/SNB/06 |
| 08 | store.example.com/SNB/07 |
| 09 | store.example.com/SNB/08 |
| 10 | store.example.com/SNB/09 |
| 11 | store.example.com/SNC/16 |

The set of rules may include additional information, such as expiration dates that indicate when a rule is to expire (thereby causing the data storage manager to recreate or update the rule), whether a rule corresponds to a write I/O operation or a read I/O operation, a location of a replica of a block of the volume, and so on. In some embodiments, the data storage manager maintains its set of rules in persistent storage, such as the data store. Thus, included in the initialization of the data storage manager may be configuring the persistent storage for receipt of the set of rules and/or storing the set of rules into the persistent storage once generated by the data storage manager.

In generating the set of rules in 904, the data storage manager may also take into consideration whether the volume is a new (unwritten) volume or is a pre-existing volume or volume instantiated from a snapshot (i.e., already having allocated blocks and data stored within the volume). The data storage manager may generate the rules based on what sectors are available in a storage node for storage, which may be determinable from the addressable resource pool obtained in 902.

In 906, the data storage manager contacts the host upon which the computing instance that requested the volume resides (using the Internet Protocol address, identifier, or other information usable to identify the host) and provides an initial set of rules to the host. The initial set of rules may be a complete set of rules for the volume (e.g., which may be generated in 904) or may be a subset of the complete set of rules. The subset of rules may be a subset that the data storage manager determines are likely to be the initial rules sought by the instance requesting the volume. For example, if the volume has been newly created, the subset of rules may include rules for the first starting block of the volume and a certain number of consecutive blocks following the starting block.

In 908, the data storage manager determines whether the host has indicated that a rule sought is not available within the particular set of rules accessible to the host. As noted, in some embodiments the data storage manager may poll the host with the request regarding whether the host needs an updated set of rules (i.e., the data storage manager initiates a polling inquiry). In some implementations, this may be a long poll; that is, the data storage manager may send a request to the host whether the host needs an updated set of rules. If the host does not need an updated set of rules, the host may keep the request open for a certain amount of time (e.g., three seconds, 10 seconds, 20 seconds, etc.) before responding to the data storage manager that no updated set of rules is sought (e.g., respond with null, zero, etc.). The data storage manager may follow up with another additional long poll and so on until receiving an indication that updated rules are sought.

On the other hand, if the host does seek an updated set of rules, the host may respond with an exception (e.g., the exception 116 of FIG. 1). In such a case, the data storage manager performing the process 900 may proceed to 910. Note, however, it is contemplated that there are various methods available to notify the block storage manager that the host seeks an updated set of rules other than long polling. For example, an agent application may be executing on the host (e.g., within a hypervisor, on the instance, within a controlling domain, etc.) that, when updated rules are sought, makes a remote procedure call to the data storage manager to which the host is assigned. As another example, the host may write data (e.g., an exception, a block of the volume that the host seeks an address to, etc.) to a storage location (e.g., in memory or other storage) accessible to both the host and the data storage manager. It is contemplated as being within the scope of the present disclosure that the host could alternatively initiate contact with the data storage manager to request an updated set/subset of rules (e.g., via a remote procedure call, application programming interface call, etc.).

In 910, the data storage manager obtains a new subset of the set of rules. The new subset of the set of rules may include rules for mapping locations to blocks that the host is seeking. As an example, the data storage manager may provide a subset of the set of rules that includes rules for a requested block of the volume and a certain number of consecutive blocks following the requested block. If the exception detected in 908 is a write request to a block of the volume that is not been allocated yet, the data storage manager may, based on the addressable resource pool, determine an available location for the new block and update its set of rules accordingly.

In some cases, the data storage manager may provide rules for a first empty block and a predetermined number of consecutive empty blocks for the volume in anticipation of I/O requests to write to consecutive blocks after the empty block is filled. While it has also been mentioned in the present disclosure that the exception may include a request for a specific rule sought to complete an I/O operation, it must also be noted that the exception may include a request for multiple rules sought to complete multiple I/O operations (e.g., the host is missing rules to complete seven I/O operations that are currently pending and includes this information with the exception). The data storage manager in these cases may provide rules sought for the multiple I/O operations, and may provide additional rules such as described above that the data storage manager deems likely to be sought within the near future (e.g., predictive determination).

Note that the new subset may not be a subset of the set of rules generated in 904; rather, due to data migration, or usage of previously available space by other volumes, additional space made available, and other reasons, the mappings of blocks to storage node locations may change between generation of the initial set of rules in 904 and the request for an updated set of rules by the host. Further, as described in the present disclosure, if a block of data of the volume for which the host already has a rule has been migrated to a different storage location or is allocated to a different storage volume, the data storage manager may cause the corresponding rule at the host to expire or otherwise be invalidated. In this manner, if the host attempts to read from or write to the storage node location corresponding to the expired or invalidated rule, the host will throw an exception indicating that it seeks an updated rule. In 912, the data storage manager provides the new/updated subset of rules to the requesting host, and then returns to 908 to continue monitoring whether the host needs another new/updated subset of rules.

Advantages provided by the system are multi-fold. For example, if the host seeks to write data and does not have a rule for the location where to write the data, the host can raise an exception and obtain a new rule from the data storage manager. If the host attempts to write to the location specified by the new rule and receives an error (e.g., the location is unavailable due to being assigned to a different volume during the intervening time, due to hardware failure, due to power event, etc.), the host can raise the exception again to get a new rule to write somewhere else. In this manner, the entity requesting the write I/O operation avoids receiving an error and writes may merely be delayed until new rules are obtained. As another example, if the data storage manager becomes unavailable (e.g., hardware failure, power event, stuck process, etc.), a new data storage manager may be instantiated/assigned to the volume and assume management of the set of rules for the volume, providing a fault-tolerant model for data storage management.

In some embodiments, each data storage manager assigned to a volume has a redundant data storage manager (primary data storage manager) also assigned to the volume (secondary data storage manager). The secondary data storage manager may or may not be instantiated on the same physical host as the primary data storage manager. In these embodiments, the secondary data storage manager may be promoted to be a primary data storage manager in an event where the prior primary data storage manager becomes unavailable (e.g., becomes nonresponsive, hardware failure, power event, network event, etc.).

Note that one or more of the operations performed in 902-12 may be performed in various orders and combinations, including in parallel. For example, in some embodiments the operations of 906 may be omitted and the data storage manager may provide the host with the initial set of rules in response to detecting an exception at 908. Furthermore, in some implementations the data storage manager may maintain sets of rules for multiple hosts; in such cases, multiple instances of the process 900 may be executing in parallel at the data storage manager.

Figure 10:
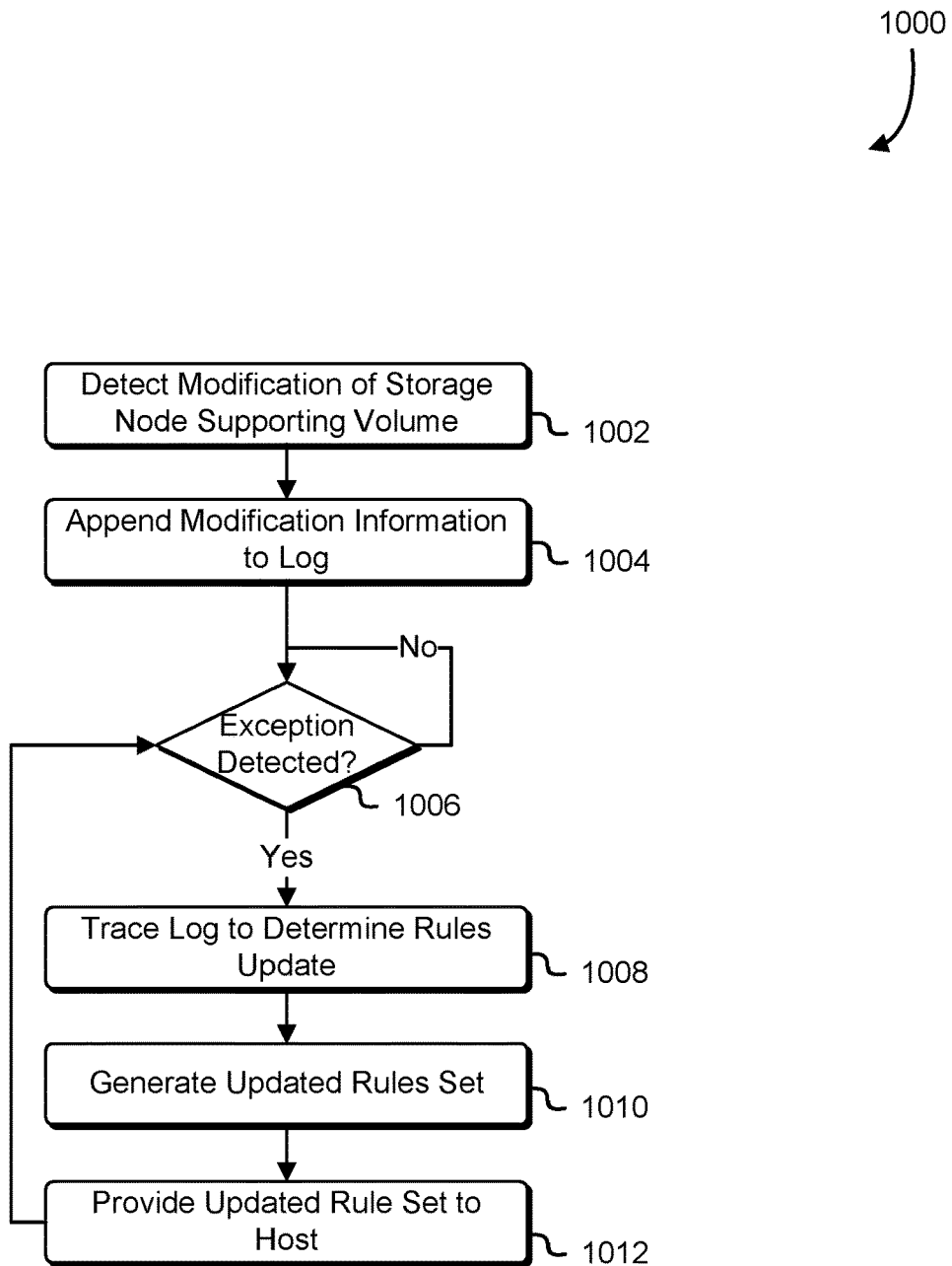
FIG. 10 is a flowchart that illustrates an example of providing a host with an update to a rule set in accordance with an embodiment.

FIG. 10 is a block diagram illustrating an example of a process 1000 for updating a set of rules provided to a host, the set of rules for accessing storage nodes supporting a logical storage volume in accordance with at least one embodiment. The process 1000 may be performed by any suitable system such as a data storage manager described above in connection with FIG. 3. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 1000 includes detecting a modification to one or more storage nodes supporting a logical storage volume 1002. The modification may include various changes or additions to the storage node(s) associated with the logical storage volume. For example, the data storage manager detects an error or failure of a particular storage node supporting a logical volume and replaces the particular storage node. In addition, modification may include performance of a snapshot operation or a data migration operation. The modifications may also include any change to the storage node or physical blocks containing or reserved for data of the logical storage volume. The data storage manager or other system executing the process 1000 may then append modification information to a log 1004. The log may be a change log or audit log containing information associated with the storage node managed by the data storage manager or other system executing the process 1000. For example, the log may include the modifications to the storage nodes supporting a particular logical volume including modifications to the portions of the storage nodes supporting the particular logical volume. The log enables the data storage manager to determine the current state of the storage nodes supporting logical volumes as well as all previous states of the storage nodes supporting the logical volumes. As described in greater detail below, the data storage manager may determine an update to a set of rules by at least tracing the log. The data storage manager may monitor whether the host needs another new/updated subset of rules 1006.

If the data storage manager detects an exception, the data storage manager or other system executing the process 1000 may then trace the log to determine a rules update 1008. In some embodiments, additional information is required to determine the rules update, such as a previous update or rule set provided to the host. For example, the data storage manager may maintain a separate table or similar data structure including information indicating various points in time, during which particular hosts generated exceptions. The data storage manager may store information indicating when particular hosts generated an exception and received an updated rule set. This information may also be maintained in the log described above. Alternatively, the exception or information associated with the exception may indicate the last time the host received and update the rule set. This information can then be used to determine what updated rules to provide the host based at least in part on the log.

A rules update includes any update or modification to the set of rules utilized by a host to process and/or transmit storage requests obtained from a computing instance to particular storage nodes. The set of rules includes any of the rules described above. The data storage manager may then generate an updated rule set 1010. The updated rule set may include all or a portion of a data structure used by the host as described above. In some embodiments, the data storage manager generates a set of executable instructions based at least in part on the updated rule set. The executable instructions, when executed by one or more processors of the host, enable the host to process and/or transmit storage requests obtained from a computing instance to particular storage nodes.

The data storage manager or other system executing the process 1000 may then provide the updated rule set to the host responsible for providing the exception 1012. As described above, the updated rule set may be provided as binary code or other executable code or a data structure or other data including the set of rules. Furthermore, the updated rule set may be provided or transmitted over one or more networks to the host. In numerous variations to the process 1000, the host may simply request a set of updates to the rule for an interval of time, for example, all the modifications to the rules since yesterday or in the last hour. In addition, the host may periodically or aperiodically query the data storage manager for an update to the rules. For example, every hour the host may query the data storage manager for an update to the rules. In yet other variations to the process 1000, the data storage manager may periodically or aperiodically determine and update the rules and provide the update to the host regardless of whether an exception was detected. For example, once a day the data storage manager transmits an update to the set of rules to the host based at least in part on the modifications to the storage nodes that occurred since the last update was provided to the host. The data storage manager may transmit the set of rules and/or update to the set of rules synchronously or asynchronously with the process 1000.

Figure 11:
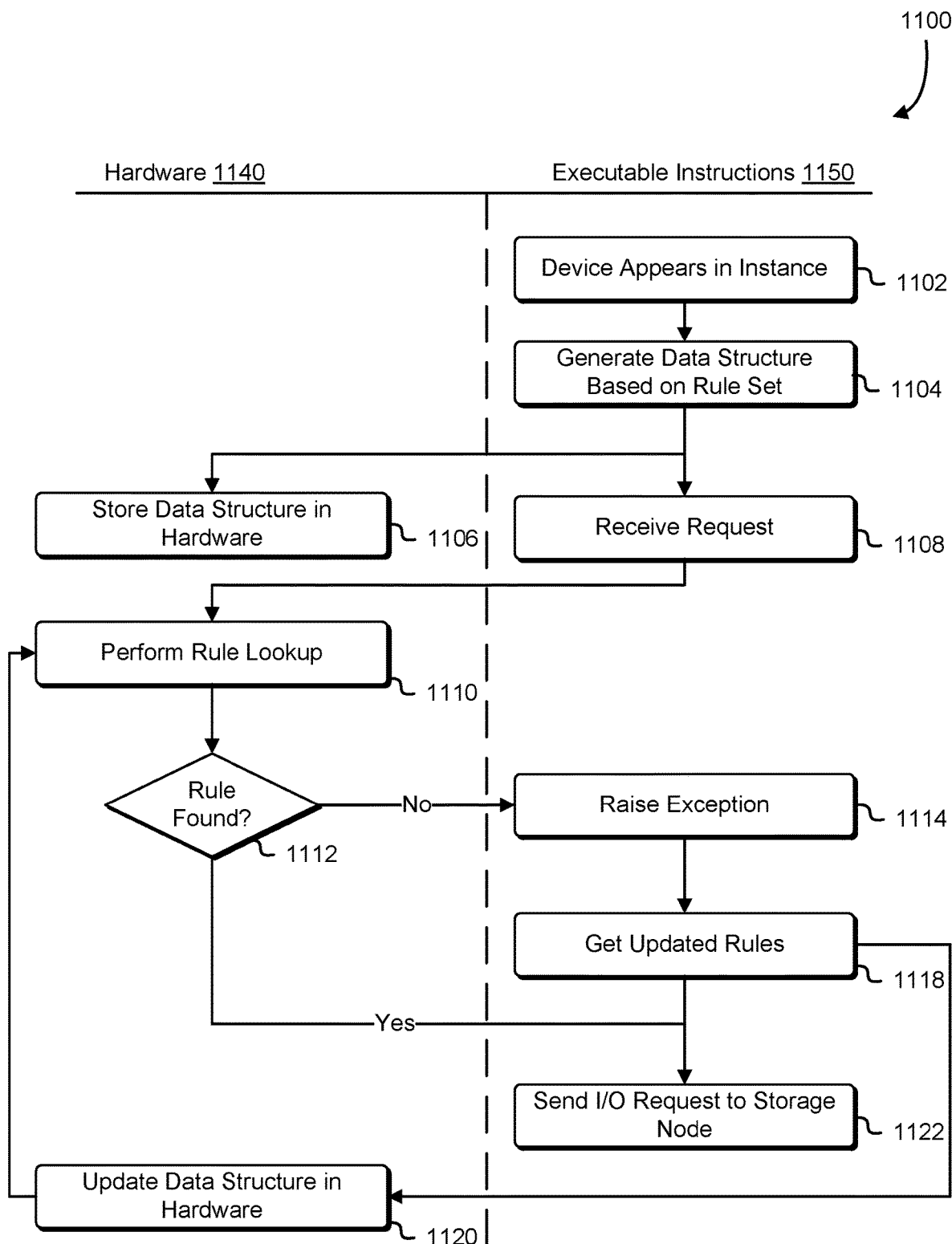
FIG. 11 is a flowchart that illustrates an example of a hybrid model for processing storage requests in accordance with an embodiment.

FIG. 11 is a block diagram illustrating an example of a process 1100 for processing an I/O request by a host based at least in part on a set of rules, the set of rules for accessing storage nodes supporting a logical storage volume in accordance with at least one embodiment. The process 1100 may be performed by any suitable system such as the host described above in connection with FIG. 3. Some or all of the process 1100 (or any other processes described, or variations and/or combinations of those processes) may be performed under the control of one or more computer systems configured with executable instructions 1150 and/or other data, and may be implemented as executable instructions 1150 executing collectively on one or more processors or other physical hardware 1140. The executable instructions 1150 and/or other data may be stored on a non-transitory computer-readable storage medium (e.g., a computer program persistently stored on magnetic, optical, or flash media). The process 1100 illustrated in FIG. 14, includes operations that are performed by particular physical hardware 1140 devices (e.g., CAM) and other operations performed by the host based at least in part on executable instructions 1150.

The process 1100 includes the logical volume appearing as a device in a computing instance supported by the host 1102. This may include providing a response to the requester that indicates that creation and attachment of the volume has been successful, whereupon the volume may appear in the storage device to the instance/requester. The host may then generate a data structure based at least in part on the set of rules 1104. The set of rules may be received from the data storage manager as described above. As described above, the set of rules may be provided in a hierarchical data structure, and the host may convert or otherwise generate a flattened data structure (e.g., a table) based at least in part on the hierarchical data structure. The data structure may also include an indication of portions of the logical volume that are uninitialized or do not contain any data. The host may then store 1106 the data structure in hardware 1140, such that the hardware 1140 may be used to process an I/O request. Storing the data structure in hardware 1140 may reduce latency when processing requests and reduce an amount of time required to perform lookup operations using the data structure. The hardware 1140 may include one or more CAMs or FPGAs as described above.

For example, the data structure may be inputted or otherwise provided to one or more CAMs representing expected behavior (e.g., a successful lookup operation) while maintaining executable instructions 1150 for exceptions. The executable instructions 1150 may include a representation of a portion of the data structure or a set of operations for generating an exception. The hardware 1140 and/or data structure may include pre-program and/or default information for certain I/O operations. For example, the hardware 1140 and/or data structure may include information associated with storage nodes that have been pre-allocated or otherwise associated with the logical storage volume. In another example, credentials, encryption information, protocol information, or any other additional information described above may be included in the hardware 1140 and/or data structure. The information included in the hardware 1140 may include information not included in the data structure. For example, information associated with the pre-allocated storage nodes may not be included in the data structure and may be obtained from the data storage manager or other system described above. As described in greater detail below, if the hardware 1140 generates an error, the executable instructions 1150 may include a set of operations to be performed in response to the error. Errors include memory error, conflicts, collisions, invalid return response, or any other error that may be generated by physical hardware 1140.

In some embodiments, the first request (e.g., first read request or first write request) may cause the hardware 1140 to generate an exception by default, as a result, a graceful failover may be initiated by the executable instructions 1150 which causes the host to generate an exception and, as part of generating the exception, obtain from the data storage manager the information required to process the I/O request (e.g., location and offsets of the storage nodes associated with a range included in the I/O request.

The host may receive a request 1108. The host computing device performing the process 1100 receives a request to perform an I/O operation. The request may be received from an entity such as a virtual machine instance running on the host computing device. The request and/or information included in the request may then be transmitted to the hardware 1140 so that the hardware 1140 may perform rule lookup 1110. The hardware 1140 may perform a search of a local copy of a rule lookup table or other data structure stored in the hardware 1140. The data structure may correspond to the volume for which the I/O request is intended.

The hardware 1140 determines whether the rule lookup table contains an entry specifying the location of where the I/O operation corresponding to the request should be performed. If the rule lookup table is missing this entry, if the entry is expired in the rule lookup table, if an attempt made to perform the I/O operation to that entry found in the lookup table results in an error, or if the rule lookup table is otherwise inaccessible, the host may proceed to 1114 of the process 1100 and the executable instructions 1150 may cause an exception to be generated. The host computing device raises a flag that indicates that an update to the local rules table is sought. In some embodiments, this involves responding to a long poll from the data storage manager with a value that indicates that a rules update is requested. In some implementations, the flag includes metadata about the I/O operation (e.g., where the operation is intended to write to, or read from, amount of read/write data, etc.) from which the data storage manager can determine which rules to provide to the host computing device.

As a result of throwing the exception, the host may receive updated rules 1118. The updated rules may include additional information such as additional ranges that may be included in other I/O requests. For example, the data storage manager may utilize an algorithm that identifies a number of blocks of the volume that are sequential to a block sought by the host computing device (e.g., as identified by the exception or by an application programming interface call). Such an algorithm "predicts" (and may be referred to herein as a "predictive algorithm") that the host computing device is likely to seek these sequential blocks within a certain interval of time. Consequently, the data storage manager may include additional rules for ranges that correspond to the sequential blocks identified. In this manner the data storage manager may attempt to predict the next I/O request that may be generated by the computing instance and provide the associated rule prior to the host generating an exception and requesting the additional rules. The data storage manager may determine an amount of additional rules to provide the host in response to the exception or other indication from the host that the rules sought by the host are lacked by the host. The number of blocks may be a fixed number, may be based on a current workload, may be based on network bandwidth, or may be based on some other scheme. It is contemplated that other predictive algorithms/schemes may be utilized; for example, an analysis of past usage of the volume may identify that certain blocks of the volume are more frequently accessed at certain times of the day, and the data storage manager may provide rules for those blocks prior to those certain times of the day in anticipation of the host computing system seeking to access those blocks. As another example of a predictive algorithm, rules for a set of empty blocks may be provided to enable the host computing system to perform new writes without raising an exception or requesting an update set of rules.

The host may then update 1120 the data structure or other information included in the hardware 1140. The host may generate an update to the hardware 1140 or the update may be included in the updated rules (e.g., a new binary object representing the updated rules). In addition, the host may perform various operations to enable the hardware 1140 to be updated. For example, the range or ranges that are to be modified based at least in part on the updated rules may be invalidated. Returning to step 1112 described above, if the rule is found, the host computing device forwards the request 1122 to the storage node (e.g., the storage node 110 of FIG. 1) corresponding to the entry in the local rules table.

In numerous variations to the process 1100, the host may receive the data structure representing the set of rules from the data storage manager and, therefore, the process 1100 may not include the host generating the data structure based at least in part on the set of rules. In addition, the data storage managers may provide the set of rules as an executable object (e.g., binary code) or set of executable instructions as described above. In such embodiments, the host may simply load the executable instructions into the physical hardware 1140. In yet other embodiments, the physical hardware 1140 may include virtual device and/or virtualization of the physical hardware 1140.

Figure 12:
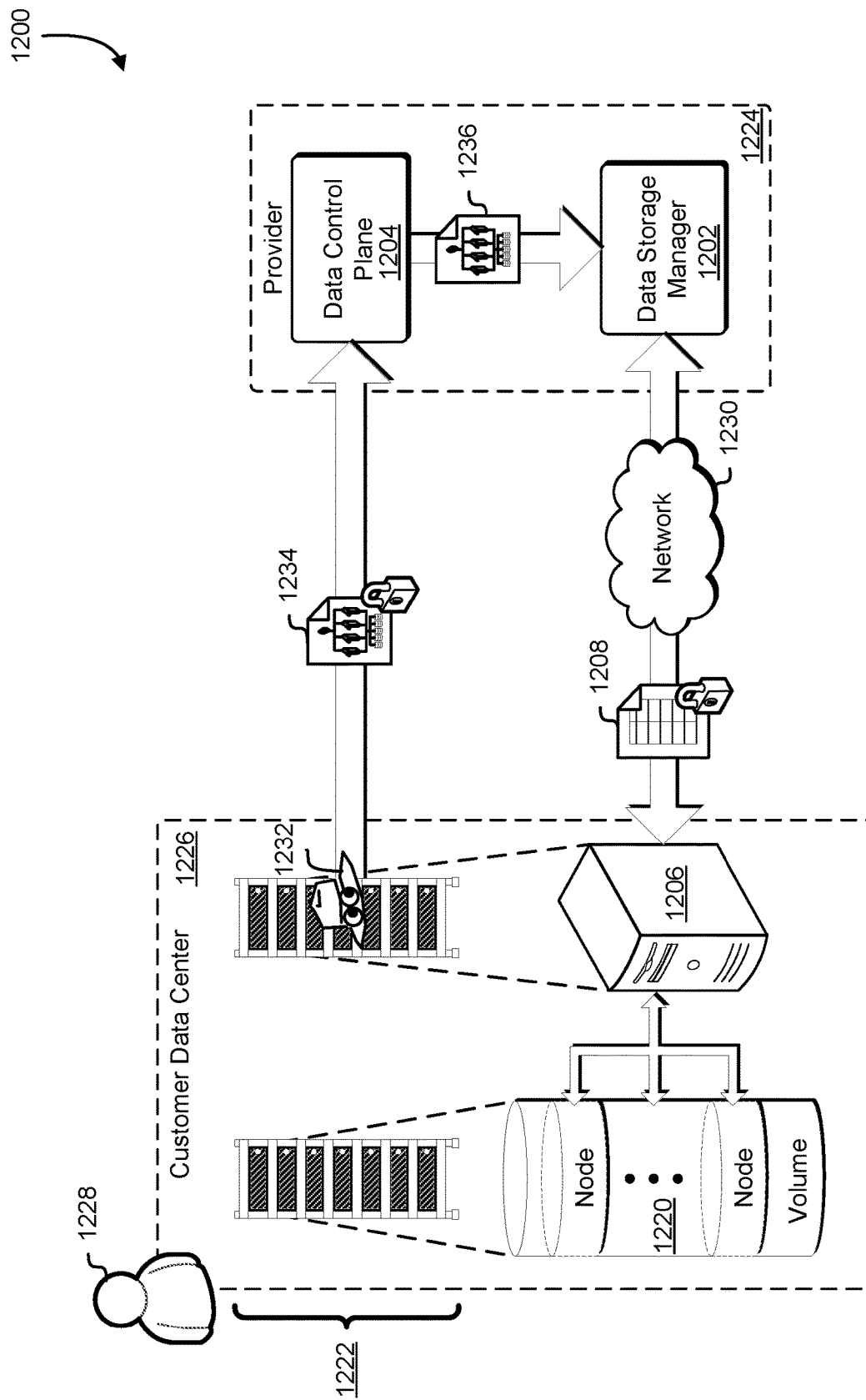
FIG. 12 illustrates an example of a data storage manager for remote storage in accordance with an embodiment.

FIG. 12 illustrates an aspect of an environment 1200 in which an embodiment may be practiced. As illustrated in FIG. 12, the environment 1200 may include a computing resource service provider 1224 that provides a data storage manager 1202 and data control plane 1204 to manage a set of rules 1208 that specify locations of storage nodes of a volume 1220 that physically resides at a location external/extraneous to the computing resource service provider 1224, such as a data center 1226 owned or leased by a customer 1228 of the computing resource service provider 1224.

The data storage manager 1202 may be similar to the data storage manager 102 of FIG. 1. The data control plane 1204 may be similar to the data control plane 104 of FIG. 1. The application server 1206 may be a server, similar to the application server 2008 of FIG. 20, located external to the computing resource service provider 1224 environment. The application server 1206 may be configured to execute computer applications on behalf of the customer 1228. The application server 1206 may read from and write to the volume 1220 as a standalone server or via one or more virtual machine instances running on the application server 1206.

The set of rules 1208 may be similar to the set of rules 108 of FIG. 1. For example, the set of rules 1208 may include information usable to locate a block of the volume 1220 in a storage node of the servers 1222, information usable to encrypt/decrypt data in the block, information usable to authenticate to the storage nodes, and so on. However, in the environment 1200, the set of rules 1208 are rules for the volume 1220 external (e.g., the data center 1226) to the computing resource service provider 1224. Moreover, the set of rules 1208 may be encrypted by the data storage manager 1202 before being provided to the application server 1206, which may then decrypt the set of rules 1208 using a cryptographic key held by the application server 1206. The cryptographic key may be a symmetric (e.g., session) key or may be an asymmetric key pair (e.g., the data storage manager 1202 holds a public key for encrypting the set of rules 1208 and the application server 1206 holds a private key for decrypting the encrypted set of rules 1208). However, it is also contemplated that the set of rules 108 may likewise be encrypted by the data storage manager 102 before being provided to the host 106, which may then decrypt the set of rules 108 using a cryptographic key held by the host 106.

In some embodiments, the data storage manager 1202 may determine that the application server 1206 is seeking the set of rules 1208 by polling the application server 1206 through an application programming interface exposed to the data storage manager 1202 by the customer 1228. Likewise, in various embodiments, the data storage manager 1202 may push the set of rules 1208 to the application server 1206 via a call to an application programming interface that the customer 1228 has exposed to the data storage manager 1202. The application programming interface call can include, as parameter values, the set of rules 1208 and/or other information usable by the application server 1206 to access data in the volume 1220. Alternatively or additionally, the application server 1206 may pull the set of rules 1208 from the data storage manager 1202 by making call to an application programming interface of the computing resource service provider 1224 for the set of rules 1208 (e.g., "getRules( )" application programming interface call).

The volume 1220 may be similar to the logical data storage volume 120 of FIG. 1, other than that the volume 1220 may be hosted on hardware (e.g. the servers 1222) external (e.g., the data center 1226) to the computing resource service provider 1224. The servers 1222 may include one or more servers such as the application server 2008, the web server 2006, or a server hosting the data store 2010 of FIG. 20. The servers 1222 may include block-level storage devices such as a storage-area network (SAN). Additionally or alternatively, the servers 1222 may include network-attached storage (NAS), SAN-NAS hybrid storage, or other storage systems.

The computing resource service provider 1224 may provide one or more computing resource services to its customers, such as the customer 1228, individually or as a combination of services of a distributed computer system. The one or more computing resource services of the computing resource service provider may be accessible to customers via a network and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described. Customers of the computing resource service provider 1224 may communicate with one or more of the services via an interface, which may be a web services interface or any other type of customer interface. Each service provided by a computing resource service provider may have its own interface, and subsets of the services may have corresponding individual interfaces in addition to, or as an alternative to, a common interface.

The customer 1228 may communicate with the computing resource service provider through a network 1230. The network 1230 represents the path of communication between the user and the computer resource service provider whereby the network 1230 may be a communication network, such as the Internet, an intranet, an internet service provider (ISP) network and/or some other such network as described below. The data control plane 1204 and/or data storage manager 1202 may communicate with the customer 1228 using any of a variety of communication protocols such as those described in conjunction with FIG. 20, including Direct Connect and Advanced Direct Connect protocols. The data center 1226 may be a physical environment such as a room or building having one or more servers (such as the servers 1222) arranged in various configurations. The data center 1226 may be maintained by the customer 1228 or may be maintained by a third-party computing resource provider.

By having the data storage manager 1202 and the data control plane 1204, the customer 1228 can utilize storage and computational resources already possessed by the customer 1228 while allowing operations such as volume management, snapshot in, and failover to be managed by the computing resource service provider 1224. This permits the customer 1228 to take advantage of services provided by the computing resource service provider 1224 while still utilizing storage resources the customer may already possess. Furthermore, it permits the customer 1228 to maintain the data at a specific location outside of the control of the computing resource service provider. For example, in some countries certain data cannot leave the country; in this manner, the customer 1228 can utilize certain resources of the computing resource service provider 1224 located outside of the country while still maintaining the data in a data center inside the country. Furthermore, the embodiment depicted in the environment 1200 allows the customer 1228 to have control over any encryption keys used to encrypt data in the storage. For example, decryption keys for data might only reside in the environment of the data center 1226, rather than be available in the set of rules maintained by the data storage manager 1202. In the environment 1200, the addressable resource pool referred to in 902 of FIG. 9 refers a pool of addressable resources in the servers 1222 from which the volume 1220 can be created.

In an example, the data control plane 1204 has information 1236 about the topology of the storage resources in the servers 1222. The application server 1206 seeks to perform an I/O operation to the volume 1220. However, if the application server 1206 does not have the location information for the I/O operation in a local set of rules (i.e., the rule sought is unavailable in the local set of rules), the application server 1206 may raise an exception or otherwise notify the data storage manager 1202 that a new set of rules is sought for the volume 1220. Alternatively, in some embodiments the application server 1206 makes an application programming interface call (API) to the data storage manager 1202 requesting a new set of rules. The request may include information about the I/O operation. In response, the data storage manager authenticates the request (e.g., by submitting credential information included with the API call to an authentication server of the computing resource service provider 1224) as originating from an entity on the behalf of the customer 1228 and, based on the topology information 1236 provided by the data control plane 1204, the data storage manager 1202 may determine a location for the I/O request, and possibly other rules, and send the updated rules 1208 through the network 1230 to the application server 1206.

The updated rules 1208 and other rules provided by the data storage manager 1202 to the application server 1206 may be encrypted for security purposes using a cryptographic key. Operations that utilize cryptographic keys include but are not limited to public key and/or private key cryptographic algorithms. Variations utilize symmetric and/or asymmetric cryptographic primitives. Example symmetric key algorithms include but are not limited to the advanced encryption standard (AES), the data encryption standard (DES), triple DES (3DES), Serpent, Twofish, blowfish, CASTS, RC4 and the international data encryption algorithm (IDEA). Asymmetric key algorithms may also include various schemes for performing cryptographic operations on data. Example algorithms include but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Other algorithms and combinations of algorithms are also considered as being within the scope of the present disclosure, and the above is not intended to be an exhaustive list. Likewise, the exception raised by the application server 1206 may also be encrypted in a manner such that it can be decrypted by the data storage manager 1202 (e.g., encrypted using a public key held by the application server 1206 and decrypted using a private key held by the data storage manager 1202).

In some embodiments, the topology information 1234 of the storage resources of the customer 1228 may be relayed to the data control plane 1204 via an application 1232 (e.g., a software agent or other software application running in data center 1226) provided to the customer 1228 by the computing resource service provider 1224. The application 1232 may run on a computing device in the data center 1226 that has access to the storage nodes of the servers 1222. The application 1232 may collect the information 1234 (e.g., addressable locations within the storage nodes, amount of available storage, etc.), and provide the information 1234 to the data control plane 1204. In some cases, rather than delivering the information 1234 directly to the data control plane 1204, the application 1232 may provide the information 1234 to a storage location (e.g., data store) accessible to both the application 1232 and the data control plane 1204. In an event where there is a change to the addressable locations, such as if a storage device is added, removed, or replaced or if some addressable storage locations become unavailable (e.g., the customer 1228 utilizes them for another purpose), the application 1232 may provide the data control plane 1204 with updated information 1234 about the addressable storage locations. The information 1234 may be provided in encrypted form such that the information 1234 is inaccessible to entities other than entities associated with the customer 1228 and entities associated with the computing resource service provider.

In some embodiments, the data storage manager 1202 may manage creation of the volume, such as by making appropriate calls to an application programming interface that the customer 1228 has exposed to the computing resource service provider 1224 that cause creation and management of the volume 1220 on the servers 1222. That is, the data storage manager 1202 (or other component of the computing resource service provider 1224) may make a call to an application programming interface of the customer 1228 that causes the servers 1222 to allocate a block device (e.g., the volume 1220) for a host instance (e.g., virtual machine instance running on the application server 1206, etc.) and utilize the data storage manager 1202 to manage the block device.

The information 1234 may be provided to the computing resource service provider 1224 prior to or in conjunction with a request by an entity of the customer 1228 to create and/or attach the volume 1220. In some embodiments, the customer 1228 exposes an application programming interface that, as a result of being called by the computing resource service provider 1224, causes the volume 1220 to be created or portions of storage nodes to be reserved for the volume in accordance with parameters specified by the computing resource service provider 1223. That is, once the data control plane 1204 and the data storage manager 1202 determine, from the topology information 1234, the locations within the servers 1222 to store the volume, the computing resource service provider 1224 may call the application programming interface to cause the volume 1220 to be created and/or attached to the application server 1206.

In other embodiments, for creation of a volume of size X, the servers 1222 allocate storage in the amount of size X and communicate information about associated with the allocated amount to the data control plane 1204. In this manner, the data storage manager 1202 can receive the information 1234 from the data control plane 1204 usable by the data storage manager 1202 to determine where blocks of the volume 1220 are to be placed within the allocated amount. In some of these embodiments, the data storage manager 1202 may be specifically assigned to the particular customer. In other embodiments, the data storage manager 1202 may provide data management services to multiple customers.

Figure 13:
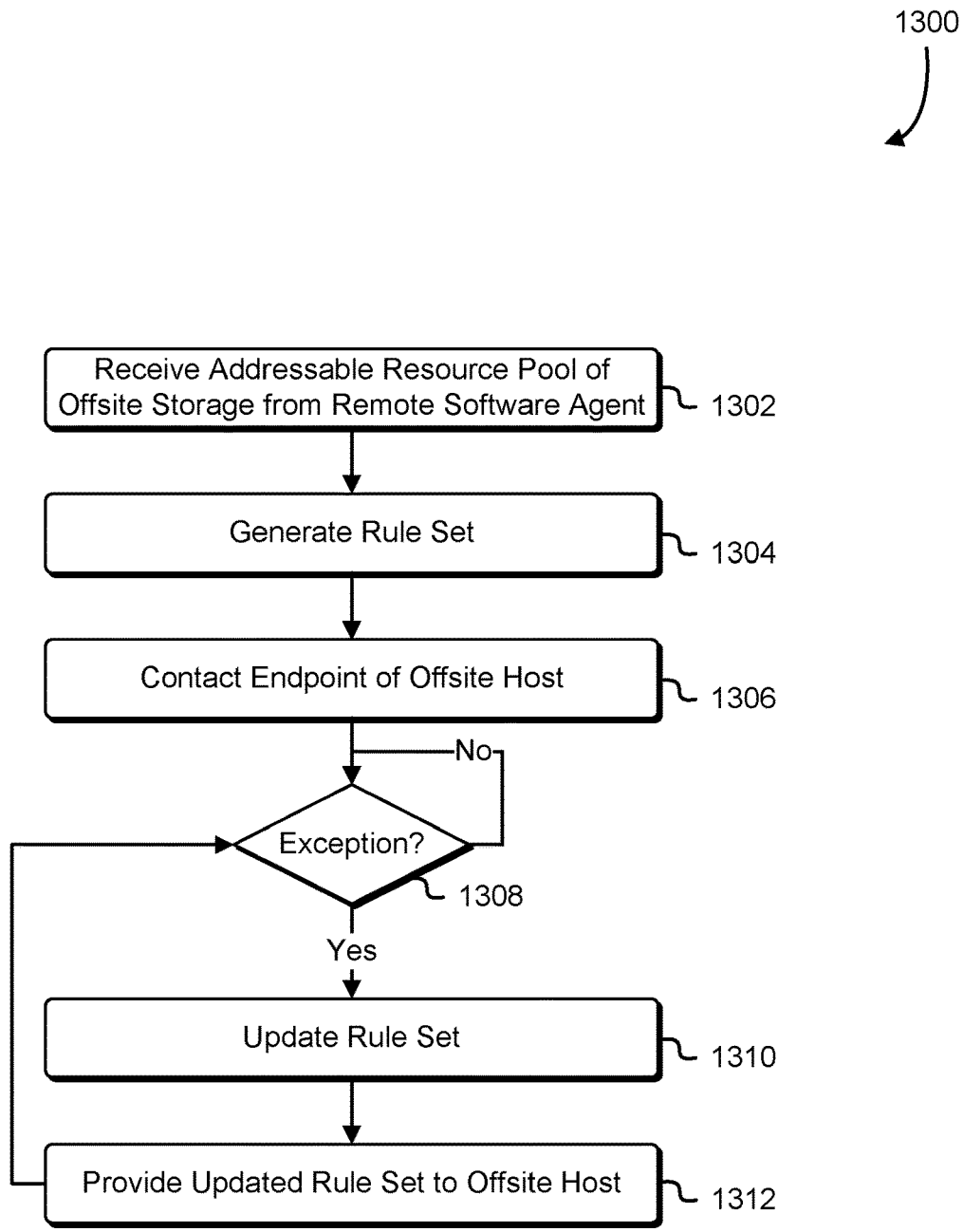
FIG. 13 is a flowchart that illustrates an example of a data storage manager managing off-site storage in accordance with an embodiment.

FIG. 13 is a flowchart illustrating an example of a process 1300 for a data storage manager that provides data storage services to storage resources located external to the computing resource service provider providing the data storage manager in accordance with various embodiments. Some or all of the process 1300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1300 may be performed by any suitable system, such as a server in a data center, by various components of the environment 2000 described in conjunction with FIG. 20, such as the web server 2006 or the application server 2008, by multiple computing devices in a distributed system of a computing resource service provider, or by any electronic client device such as the electronic client device 2002. The process 1300 includes a series of operations wherein a software agent running in the infrastructure of a storage system external to the computing resource service provider providing the data storage manager obtains information about the topology information 1234 of the external storage service. Based on the topology information 1234, the data storage manager generates a set of rules for the external storage service, contacts an endpoint of a host (also external to the computing resource service provider) communicatively coupled to the external data storage service, and provides rules and updated rules to the external host as requested.

As noted in the description of the environment 1200 of FIG. 12, a software agent may be running in a storage environment external to the computing resource service provider that provides the data storage manager performing the process 1300. The software agent may collect information about the topology of the external storage environment and, as a result of receiving a request from a host located external to the computing resource service provider providing the data storage manager, provide that information to a data control plane or directly to the data storage manager. From the information, in 1302, a set of addresses and/or offsets or ranges of locations in storage where data for the volume can be stored may be determined and obtained by the data storage manager. The information may include an Internet Protocol address corresponding to an endpoint of a host that seeks to perform I/O operations to a volume comprising blocks distributed within the addressable pool of resources.

In 1304, from the addressable pool, the data storage manager generates a set of rules for the volume. As an example, the data storage manager may receive, included with the addressable resource pool, a list of storage nodes at the external site and a requested size of the volume. In 1306, the data storage manager contacts the external host and provides at least a subset of the set of rules to the host.

In 1308, the data storage manager polls the external host, such as using long polls, to determine whether the external host indicates that it seeks a rule that cannot be found in the at least a subset of the set of rules previously provided by the data storage manager. If the host does not need an updated set of rules, the host may keep the request open for a certain amount of time (e.g., three seconds, 10 seconds, 20 seconds, etc.) before responding to the data storage manager that no updated set of rules is sought (e.g., respond with null, zero, etc.). If no such indication is detected, the data storage manager may repeat the operations of 1308 indefinitely.

On the other hand, if the external host does seek an updated set of rules, the external host may respond with an exception. In such a case, the data storage manager performing the process 1300 may proceed to 1310. Note, however, it is contemplated that there are various methods available to notify the block storage manager that the host seeks an updated set of rules other than long polling. For example, an agent application may be executing on the host (e.g., within a hypervisor, on the instance, within a controlling domain, etc.) that, when updated rules are sought, makes a remote procedure call to the data storage manager to which the host is assigned. As another example, the host may write data (e.g., an exception, a block of the volume that the host seeks an address to, etc.) to a storage location (e.g., in memory or other storage) accessible to both the host and the data storage manager.

In 1310, the data storage manager obtains a new subset of the set of rules that includes the rule. Note however, that the entire set of rules may be updated on an ongoing basis or in portions on occasions that an updated set of rules is needed; that is, the software agent may provide regular or irregular updates about the topology of the storage system at the external site which may necessitate updating the set of rules.

In 1312, the data storage manager provides the external host with the updated subset of rules via the endpoint of the external host, and then returns to 1308 to continue monitoring whether the external host needs another updated subset of rules. Note that one or more of the operations performed in 1302-12 may be performed in various orders and combinations, including in parallel.

Figure 14:
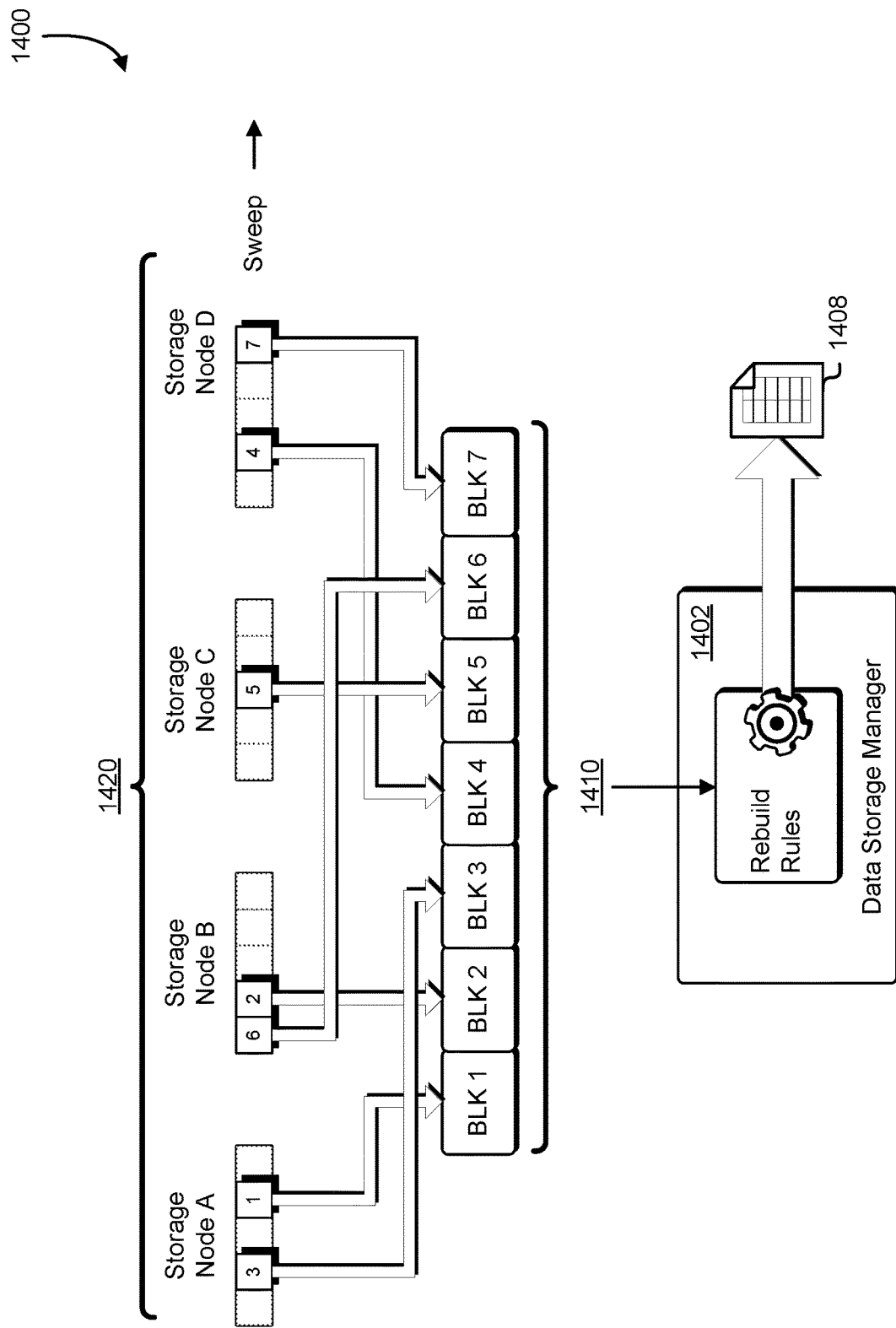
FIG. 14 illustrates another example of authoritativeness with a stateless data storage manager in accordance with an embodiment.

FIG. 14 illustrates a first example embodiment 1400 illustrating authoritativeness of the system described in the present disclosure. Specifically, FIG. 14 depicts an embodiment where a data storage manager 1402, in contrast to the data storage manager 302 of FIG. 3, is stateless. Note that FIG. 14 is intended to be illustrative, and it is contemplated that other techniques may be used to implement a stateless data storage manager, such as those described in conjunction with FIG. 16. In particular, FIG. 14 depicts blocks of a volume 1410 that have been written to a plurality of storage nodes 1420. The block include at least data as well as metadata that includes information usable to rebuild a set of rules 1408 containing the information about the storage locations of the volume 1410 in an event where a data storage manager managing the volume is rendered unavailable (e.g., stops responding, experiences an error, goes off-line due to a power event, etc.) and a new data storage manager 1402 is instantiated to assume responsibility for management of the volume.

The data storage manager 1402 may be similar to the data storage manager 102 of FIG. 1. The set of rebuilt rules 1408 may be a set of rules for the volume 1410 that has been reconstructed to replace a previous set of rules which may have become lost or corrupted. Thus, the set of rebuilt rules 1408 may be one or more entries in a data table with information about a portion (e.g., a block or series of blocks) of the volume 1410 comprised of blocks distributed among the storage nodes 1420.

The blocks in the storage nodes are illustrated with operation numbers from "1" to "7," with storage node A having blocks "1" and "3," storage node B having blocks "2" and "6," storage nodes C having block "5," and storage node D having blocks "4" and "7."

In some examples, a "replica identifier" may refer to a value that identifies a replica (e.g., backup copy) of the block. That is, in implementations where blocks are replicated, metadata in the block may include information that allows the data storage manager 1602 to identify and locate the replica blocks of the volume 1410. For example, a replica identifier for block 4 may include an identifier for the replica of block 4 or location information where the replica for block 4 may be found. Likewise, the replica of block 4 may include, as a replica identifier, location information where block 4 itself may be found. In this manner, in an event where a block above volume becomes damaged, a replica of the damaged block can be found and itself be replicated in order to repair the volume. As part of the process for moving any of the blocks (e.g. by a relocation service), as blocks are relocated, the location information in the metadata for subsequent blocks may updated to reflect new locations of the blocks. In these implementations, a write rule or rules may specify to write to more than one location; that is, a write rule may state to write a first copy of the block to a first storage node and a second copy of the block to a second storage node. In some embodiments, alternative to or in addition to replicating each block, the storage nodes may include an error correcting code or otherwise utilize forward error correction, such as erasure coding, to provide the ability to recover from errors. The rules in such cases may state to write in such a manner that the data is redundant, sharded, checksummed, or otherwise distributed such that the failure of any one storage node does not cause the loss of the volume.

The volume 1410 may be a logical storage space within a data storage system in which data may be stored, similar to the logical data storage volume 120 of FIG. 1. The metadata for each of the blocks within the volume 1410 may include an identifier that corresponds to the volume 1410 to which the blocks belong. The blocks of the volume 1410 may reside in one physical storage device (e.g., a hard disk) or may be distributed among the plurality of storage nodes 1420. The storage nodes 1420 may be storage devices having regions of storage usable to be allocated to a logical data storage volume.

In the first example embodiment 1400, the data storage manager 1402 is attempting to update its set of rules or rebuild its set of rules to form the set of rebuilt rules 1408. For example, the blocks could have been moved to different nodes, rendering the current set of rules possessed by the data storage manager 1402 obsolete. Thus, when the data storage manager 1402 determines (e.g., via an exception, such as the exception 116 of FIG. 1, raised by the host 106) that a host needs an updated set of rules, the data storage manager 1402 may regenerate its set of rules, or at least regenerate a subset of the set of rules sought by the host. As another example, a previous data storage manager may have become unusable (e.g., due to a hardware or software malfunction, become too busy, nonresponsive, etc.), and the data storage manager 1402 is being initialized by a data control plane to take over management of the volume.

In the embodiment depicted in FIG. 14, the data storage manager 1402 performs a "sweep" of the nodes in a storage system searching for blocks associated with the volume 1410. As noted, each block of the volume 1410 may include metadata that includes information, such as an identifier for the volume, usable to determine to which volume the block belongs. Additionally or alternatively, the storage nodes may include metadata cataloging the blocks stored in the storage node, their location within the storage node, and/or the volume to which each block belongs. In the sweep, the data storage manager 1402 may access each storage node that could contain blocks of the volume 1410 and examine the metadata to determine the identities of blocks within the volume 1410.

For example, the data storage manager 1402 may begin the sweep with storage node A. In storage node A, the data storage manager 1402 identifies two blocks that belong to the volume 1410. The metadata for each block may include information that identifies the position in the volume 1410 to which the block corresponds (e.g., the block's offset within the volume, an order number for the block, etc.). In the sweep, the data storage manager 1402 searches storage node A, identifies the 3rd and 1st blocks of the volume 1410 and rebuilds the rules for each of these blocks; the rules including the location of the blocks, information usable to encrypt/decrypt the blocks, information usable to compress/decompress the blocks, information usable to authenticate with storage node A, and so on. The data storage manager 1402 proceeds to the next storage node in the sweep, storage node B. The data storage manager 1402 searches storage node B, identifies the 6th and 2nd blocks of the volume 1410 and, likewise, rebuilds the rules for each of these blocks. The data storage manager 1402 then searches storage node C, identifies the 5th block of volume 1410, and rebuilds the rule for this block. The data storage manager 1402 then reaches storage node D, identifies the 4th and the last (7th) block of the volume 1410, and rebuilds the rules for each of these blocks. The rules all having been rebuilt comprise the set of rules 1408, which the data storage manager 1402 may output in whole or in part, such as to a host computer system seeking one or more of the rules of the set of rules 1408.

Figure 15:
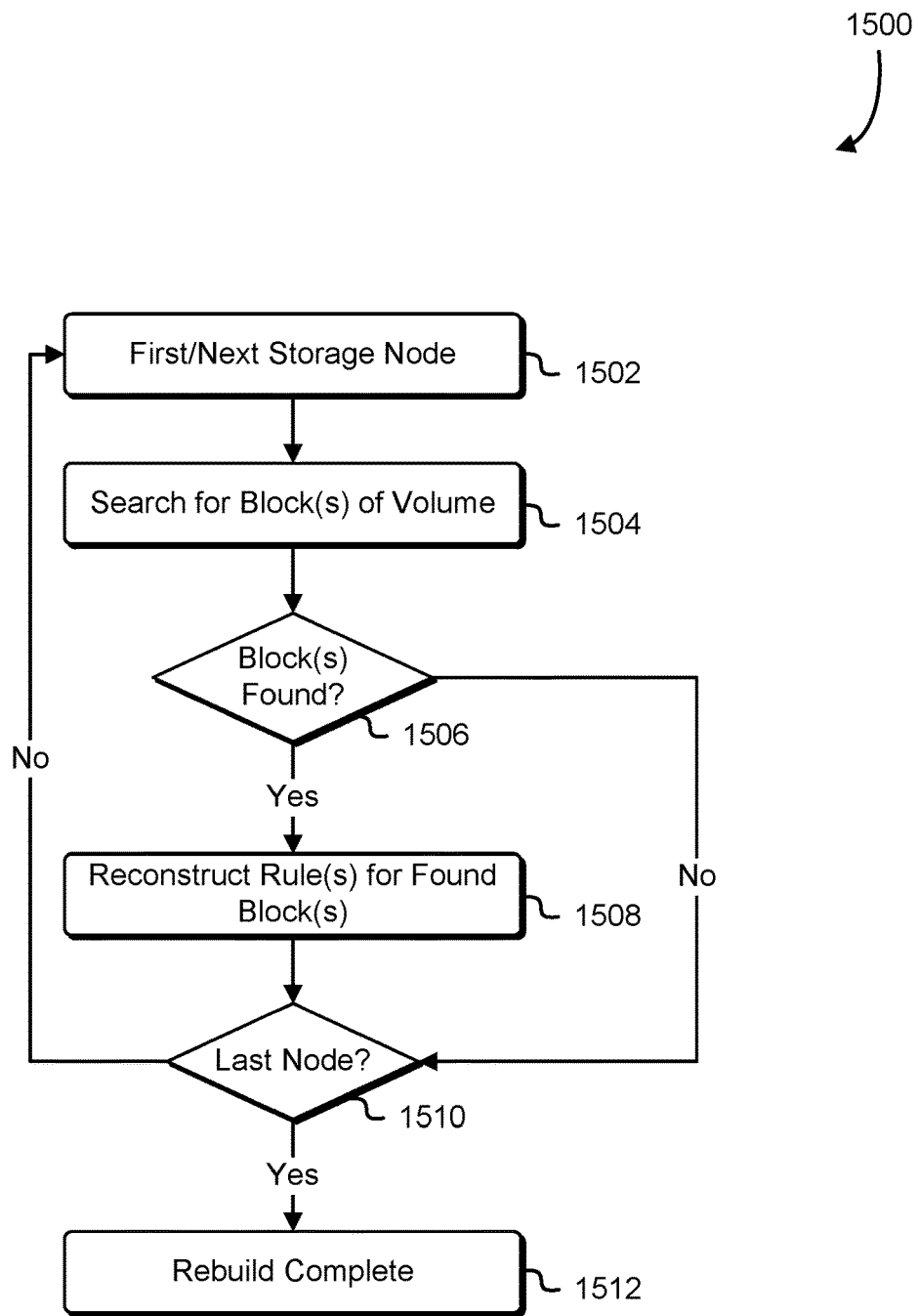
FIG. 15 is a flowchart that illustrates an another example of a data storage manager managing off-site storage in accordance with an embodiment.

FIG. 15 is a flowchart illustrating an example of a process 1500 for rebuilding a set of rules in accordance with various stateless data storage manager embodiments. Some or all of the process 1500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1500 may be performed by any suitable system, such as a server in a data center, by various components of the environment 2000 described in conjunction with FIG. 20, such as the web server 2006 or the application server 2008, by multiple computing devices in a distributed system of a computing resource service provider, or by any electronic client device such as the electronic client device 2002. The process 1500 includes a series of operations wherein a data storage manager re-creates a set of rules for a volume in an embodiment where the data is authoritative, such as is depicted in FIG. 14.

In 1502, the system begins to sweep the storage nodes that may host blocks of the volume for which the set of rules is to be rebuilt. For example, for a particular data center of a computing resource service provider, it may be that the blocks could be stored on any storage node within the data center. In some examples, a list of the storage nodes upon which the volume is distributed may be maintained in persistent storage, such as a database or with metadata. A storage service. Thus, in 1502 the system selects a first storage node to search.

In 1504, the system searches the storage node for blocks corresponding to the volume. In some cases, the system may read metadata at each block of the storage node to determine (e.g., from an identifier that identifies the volume to which the block is assigned) whether the block is associated with the volume. In other cases, the storage node may have metadata indicating where blocks for particular volumes are stored. In 1506, the system performing the process 1500 determines whether it has found blocks associated with the volume, and if so, proceeds to 1508. Otherwise, if the storage node does not contain any blocks of the volume, the system may proceed to 1510.

In 1508, the system generates a rule for each of the found blocks based on the metadata, as described above in conjunction with FIG. 14. The generated rule is then added to a set of rebuilt rules. In 1510, if the current storage node does not contain any blocks of the volume, the system performing the process 1500 may return to 1502 to sweep the next storage node. Otherwise, also in 1510, the system performing the process 1500 determines whether all of the blocks for the volume have been located, thus indicating that the set of rebuilt rules is complete, and proceeds to 1512. If the set of rebuilt rules is not complete, the system again may return to 1502 to sweep the next storage node for more blocks of the volume. Note that in some implementations, if the volume has not been completely written to (e.g., blocks allocated to the volume), the metadata of the block may not indicate whether it is the last block; in such a case, the system may determine that the set of rebuilt rules is complete after of sweep of the last storage node. Note that if the system completes a sweep of the last node and the set of rebuilt rules is incomplete (e.g., missing blocks), the system may respond with an error (not depicted) or may perform some corrective action, such as copying a replica of block to restore a missing block or restoring a missing block from snapshot.

Otherwise, if all of the blocks for the volume have been located, the system need not sweep any more storage nodes, and may proceed to 1512. In 1512, the set of rebuilt rules now being complete may be provided in whole or in part to a host computing device requesting such rules. Note that one or more of the operations performed in 1502-12 may be performed in various orders and combinations, including in parallel.

FIG. 16 illustrates a second example embodiment 1600 illustrating authoritativeness of the system described in the present disclosure. This other example embodiment may be implemented alternative to or in addition to the first example embodiment 1400 depicted in FIG. 14. Specifically, FIG. 16 depicts an embodiment where a data storage manager 1602, in contrast to the data storage manager 302 of FIG. 3, is stateless. Note that FIG. 16 is intended to be illustrative, and it is contemplated that other techniques may be used to implement a stateless data storage manager. In particular, FIG. 16 depicts a block 1610 having been written to one of a plurality of storage nodes 1620. The block includes at least data 1632 as well as metadata 1630 that includes information usable to rebuild a set of rules 1608 containing the information about the storage locations of the volume in an event where a data storage manager managing the volume is rendered unavailable (e.g., stops responding, experiences an error, goes off-line due to a power event, etc.) and a new data storage manager 1602 is instantiated to assume responsibility for management of the volume.

The data storage manager 1602 may be similar to the data storage manager 102 of FIG. 1. The set of rebuilt rules 1608 may be a set of rules for a volume that has been reconstructed to replace a previous set of rules which may have become lost or corrupted. Thus, the set of rebuilt rules 1608 may be one or more entries in a data table with information about a portion (e.g., a block or series of blocks) of the volume comprised of blocks distributed among the storage nodes 1620, such as the block 1610.

The metadata 1630 may include information about the data 1632, the block 1610, and/or related data or blocks. For example, the metadata 1630 may include a generation number, an operation number, and/or a replica identifier. In some examples, a "generation number" may refer to a number that indicates the generation of the data in the block. In some examples, an "operation number" may refer to the position of the block within a sequence of blocks (i.e., the sequence in which the blocks comprise the volume), even though the sequence of blocks may not be stored contiguously or even in any particular order on the storage nodes. For example, the blocks in the storage nodes are illustrated with operation numbers from "1" to "6," with storage node A having operation numbered blocks "2" and "3," storage node B having operation numbered blocks "6" and "1," storage nodes C having operation numbered block "4," and storage node D having operation numbered block "5."

That is, in implementations where blocks are replicated, the metadata may include a replica identifier that allows the data storage manager 1602 to identify and locate the replicas. For example, a replica identifier for block 4 may include location information where the replica for block 4 may be found. Likewise, the replica of block 4 may include, as a replica identifier, location information where block 4 itself may be found. In this manner, in an event where a block above volume becomes damaged, a replica of the damaged block can be found and itself be replicated in order to repair the volume. As part of the process for moving any of the blocks (e.g. by a relocation service), as blocks are relocated, the location information in the metadata for subsequent blocks is updated to reflect the new location of the previous block. In these implementations, a write rule or rules may specify to write to more than one location; that is, a write rule may state to write a first copy of the block to a first storage node and a second copy of the block to a second storage node. In some embodiments, alternative to or in addition to replicating each block, the storage nodes may include an error correcting code or otherwise utilize forward error correction, such as erasure coding, to provide the ability to recover from errors. The rules in such cases may state to write in such a manner that the data is redundant, sharded, checksummed, or otherwise distributed such that the failure of any one storage node does not cause the loss of the volume.

For each write of the block, the metadata may be written to include one or more of the current generation number, the current operation number, replica identifier, or volume identifier/token. In this manner, it can be determined from the metadata in the block whether the data is the latest set of data, the volume to which it belongs, and at least one other block in the sequence of blocks of the volume such that the set of rules for the volume can be reconstructed by locating each block of the volume based on the metadata of the blocks. The block 1610 may be an addressable region in a block-level storage device as described above. The data 1632 may be similar to the data 332 described in FIG. 3. The storage nodes 1620 may be storage devices having regions of storage usable to be allocated to a logical data storage volume.

In the second example embodiment 1600, the data storage manager 1602 is attempting to update its set of rules or rebuild its set of rules to form the set of rebuilt rules 1608. For example, the blocks could have been moved to different nodes, rendering the current set of rules possessed by the data storage manager 1602 obsolete. Thus, when the data storage manager 1602 determines (e.g., via an exception, such as the exception 116 of FIG. 1, raised by the host 106) that a host needs an updated set of rules, the data storage manager 1602 may regenerate its set of rules, or at least regenerate a subset of the set of rules sought by the host. As another example, a previous data storage manager may have become unusable (e.g., due to a hardware or software malfunction, become too busy, nonresponsive, etc.), and the data storage manager 1602 is being initialized by a data control plane to take over management of the volume.

In the second example embodiment 1600, the data storage manager 1602 obtains a location 1636 of the youngest block of data for the volume that it is able to determine. For example, the data storage manager 1602 may examine the metadata of all blocks associated with the volume and determine (e.g., based on operation number, timestamp, etc.) the block that is the youngest. As a different example, the data storage manager 1602 may examine its current set of rules and locate a rule corresponding to the youngest block (e.g., with the greatest operation number). In another embodiment, the location 1636 of the youngest block is stored at another location, such with a metadata storage service 1634 (or alternatively with an in-memory cache service, persistent storage, or other storage, etc.). In this manner, the other location need only persist information about the youngest block and, as described below, the set of rebuilt rules for the entire volume can be created starting from the metadata of this youngest block at the location 1636.

In the second example embodiment 1600, the data storage manager 1602 obtains, from each block, location values corresponding to the previous block. For example, the data storage manager 1602 obtains the location 1636 of the youngest block, which is revealed located on storage node C at offset 3 (block 6). Block 6 includes, within its metadata, location values that indicate that the previous block (block 5) is located on storage node D at an offset of 5. After obtaining this information from the block 6 metadata, the data storage manager 1602 can read the metadata of block 5 and determine from the location values in the metadata of block 5 that block 4 is located on storage node B at offset 1. Likewise, from block 4 the data storage manager 1602 can determine that block 3 is located at storage node A at offset 4, from block 3 that block 2 is located at storage node a at offset 2, and that block 1 is located at data storage node B at offset 2. From the metadata of block 1, the data storage manager 1602 can determine (e.g., from location information being zero, null, negative, or some other indicative value) that block 1 is the first block of the volume. In this manner, the data storage manager 1602 can recreate its set of rules as the set of rebuilt rules 1608 to reflect the current state of the volume.

In some embodiments, the data storage manager 1602 is in communication with a placement service that determines where the block should be placed in the storage devices. In some cases, the placement services are involved in relocating blocks, which may be done for various reasons including consolidation of data, defragmenting, moving data to a faster or slower storage device, and so on. In these embodiments, the placement service notifies the data storage manager 1602 if placement of a block is new or has changed since the data storage manager 1602 last generated the set of rules. Subsequently, the data storage manager 1602 may generate the set of rebuilt rules 1608 and provide (e.g., push) the set of rebuilt rules 1608 to the host to replace the host's local set of rules. Among other differences between the embodiment of FIG. 14 and the embodiment of FIG. 16 is that the each block in the former embodiment need not include any metadata about other blocks in the volume. On the other hand, in rebuilding the rules of the embodiment of FIG. 16, the data storage manager 1602 need only access the storage nodes that host blocks of the volume for which the set of rules 1608 are being rebuilt. It is contemplated that some implementations may utilize a hybrid of both FIGS. 14 and 16; for example, the data storage manager may start with the youngest block to identify the storage node where the youngest block is stored, and then sweep the storage node for other blocks associated with the volume. From the metadata of those blocks, the data storage manager may visit and sweep other storage nodes containing blocks of the volume. Note also that it is contemplated that other techniques for a stateless storage manager may be implemented alternative to or in addition to the embodiments depicted in FIGS. 14 and 16.

Figure 17:
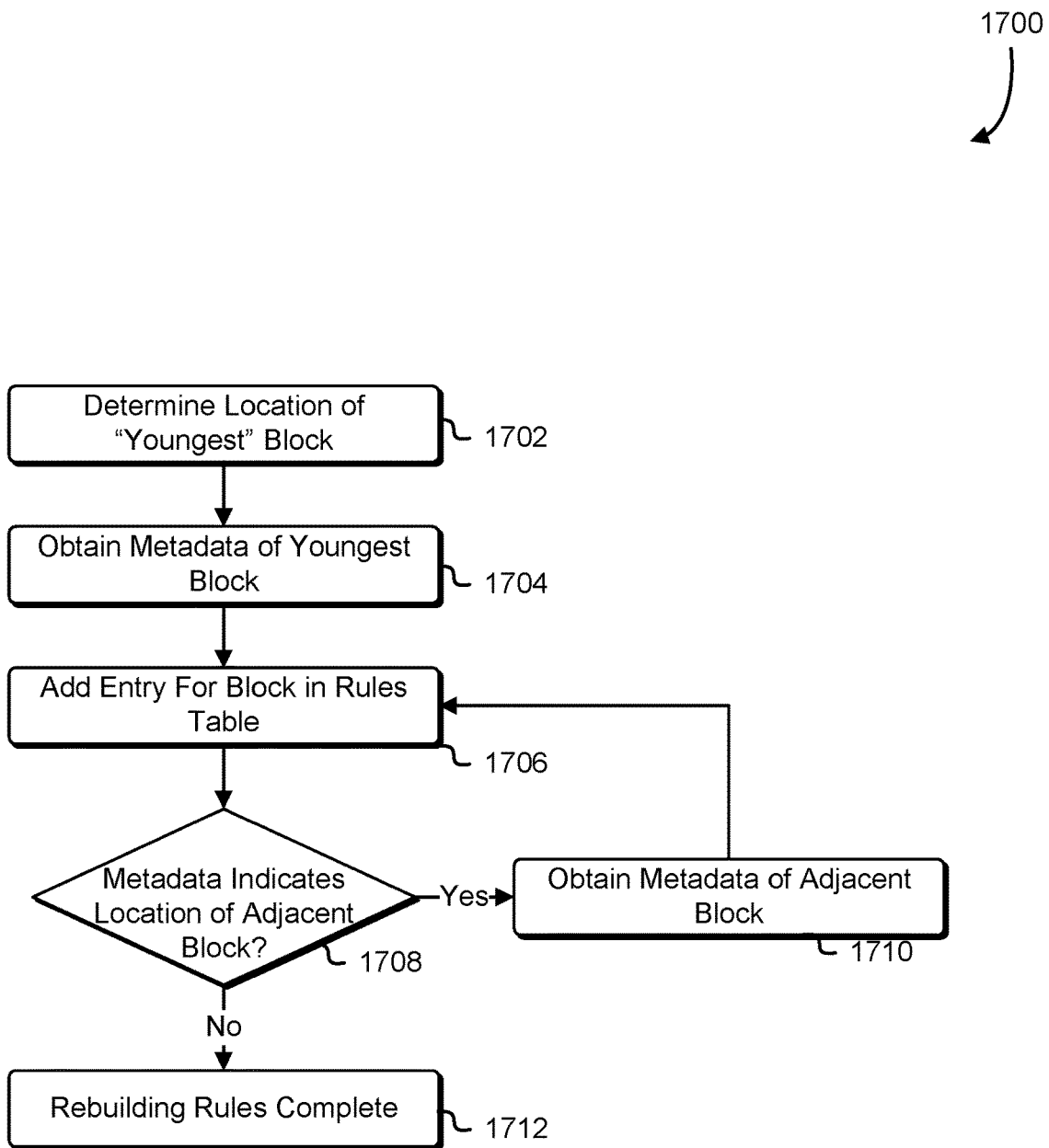
FIG. 17 is a flowchart that illustrates an example of a stateless rebuild of rules in accordance with an embodiment.

FIG. 17 is a flowchart illustrating an example of a process 1700 for rebuilding a set of rules in accordance with various stateless data storage manager embodiments. Some or all of the process 1700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1700 may be performed by any suitable system, such as a server in a data center, by various components of the environment 2000 described in conjunction with FIG. 20, such as the web server 2006 or the application server 2008, by multiple computing devices in a distributed system of a computing resource service provider, or by any electronic client device such as the electronic client device 2002. The process 1700 includes a series of operations wherein a data storage manager re-creates a set of rules for a volume in an embodiment where the data is authoritative, such as is depicted in FIG. 16.

A data storage manager, having been assigned to manage an existing volume but not having the rules for the volume (e.g., a previous data storage manager managing the existing volume may have experienced a failure event) seeks to rebuild the set of rules for the volume. Prior to 1702, the data storage manager may receive an initial set of information about the volume, such as the addressable resource pool for the volume, from a data control plane. In 1702, the data storage manager determines a location of the youngest block of the volume. In this context, a "youngest block" refers to a most recently allocated block in a sequence of blocks of the volume (e.g., a block with the highest operation number). As noted, the youngest block is not necessarily the most recently written-to block.

There are various ways to determine the identity of the youngest block. In some implementations, a storage service, a shared buffer, or database table may be utilized to store the identity and/or location of the youngest block of the volume (but not necessarily the identities and/or locations of all of the blocks of the volume). Additionally or alternatively, if the youngest block cannot be determined from a storage service, shared buffer, or database table as described above (e.g., not implemented or involved in the failure event that caused the original set of rules to become lost), the data storage server may crawl through the storage nodes looking for the youngest block (e.g., locating the block with the highest operation number).

In 1704, once the youngest block is located, the data storage manager may read the metadata for the block, such as the metadata 1630 shown in FIG. 16. The metadata may include additional information, such as identities and/or locations of one or more replicas of the block, and location information of an adjacent block. It must be noted that although FIG. 16 and FIG. 17 refer to metadata that includes an identity/location of the previous block, it is contemplated that in certain implementations the metadata could include information about the next block in addition to or alternative to the previous block. Likewise, in such implementations rather than determining the youngest block and working backwards as described in 1700, the data storage manager may alternatively determine the oldest block and work forwards. Still alternatively, in cases where the metadata includes information identifying a previous block and a next block, the data storage manager may begin with any block in the volume and perform processes to rebuild the set of rules by working both forwards and backwards from the selected block in parallel.

In 1706, from the metadata the data storage manager builds an entry for a rule (e.g., location, operation number, etc.) corresponding to the youngest block. In 1708, the data storage manager determines from the metadata a location of an adjacent block. As described above, in some implementations the adjacent block sought is a block immediately preceding the current block, whereas in other implementations the adjacent block sought would be a block immediately following the current block, or in still other implementations the data storage manager may obtain location information corresponding to both the preceding and following locks from the current block.

In 1710, upon obtaining the location of the adjacent block, the data storage manager may obtain the metadata of the adjacent block by performing a read operation of the metadata at the location indicated for the block as determined in 1708. Then, the data storage manager performing the process 1700 may return to 1706 to add an entry in the set of rebuilt rules.

Otherwise, in 1712, if the metadata of the current block indicates that the data storage manager has visited all of the allocated blocks for the volume (e.g., the current block is the first or last block, depending on implementation), the set of rebuilt rules is complete and the data storage manager may provide rules from the set of rebuilt rules to such authorized host as seeks them. Note that, as noted, one or more of the operations performed in 1702-12 may be performed in various orders and combinations, including in parallel.

Figure 18:
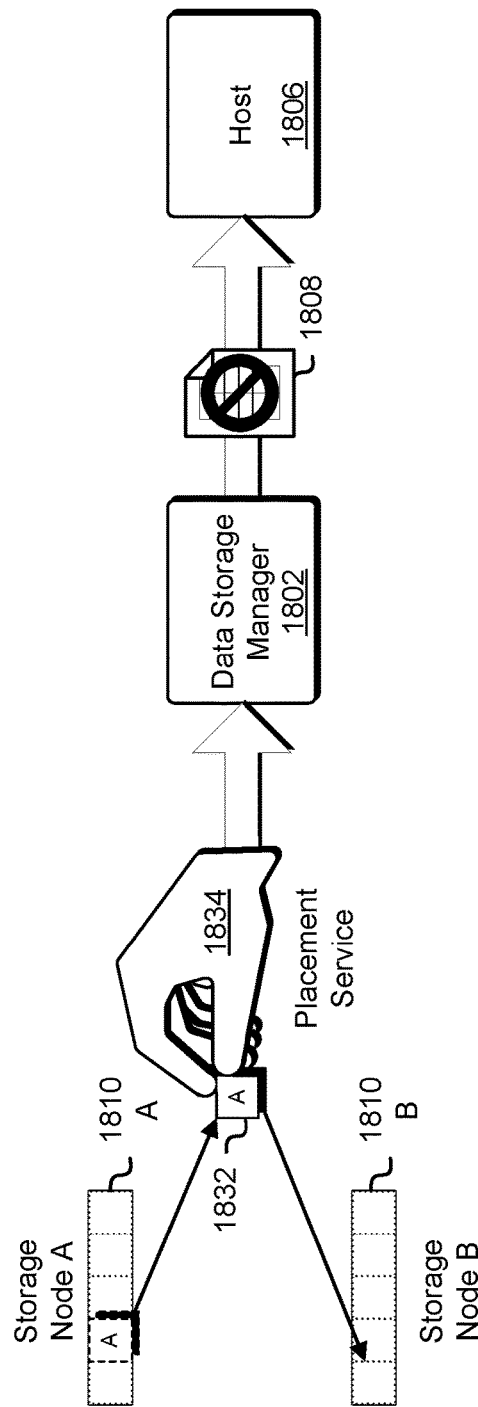
FIG. 18 illustrates an example of data migration and rule invalidation in accordance with an embodiment.

FIG. 18 illustrates an example embodiment 1800 of the present disclosure. Specifically, FIG. 18 depicts a block 1832 that has been moved from a first storage node 1810A to a second storage node 1810B by a placement service 1834. The placement service 1834 notifies the data storage manager 1802 of the location change for the block 1832, whereupon the data storage manager 1802 issues to the host 1806 a rule invalidation notice 1808 for a rule corresponding to the block 1832.

The data storage manager 1802 may be similar to the data storage manager 102 of FIG. 1. The host 1806 may be similar to the host 106 of FIG. 1. The storage nodes 1810A-10B may be similar to the storage node 110 of FIG. 1. The block 1832 may be an addressable region in a block-level storage device.

The placement service 1834 may be a service of a computing resource service provider configured to determine where blocks of customer volumes should be placed on various storage nodes. In making its determination, the placement service 1834 may be configured to evaluate the available capacities (e.g., unallocated areas) of various storage nodes and determine an appropriate storage node with available capacity to satisfy a request to allocate a block for a volume. For instance, the placement service may select a storage node that has the most available capacity, a storage node that has the smallest unallocated area sufficient to fulfill the request, a storage node hosting the fewest other blocks of the volume, or some other selection criteria. In this way, the placement service 1834 fulfills the request.

In some embodiments, as part of the process of the placement service 1834 relocating data, action is taken to prevent the host 1806 from writing to an old storage location while or after the data is being migrated from the old location to a new location. Thus, a write rule associated with the old location in the set of rules on the host is invalidated, and the data storage manager 1802 may not provide the host 1806 with a new rule associated with the new location until the data has been migrated from the old location, whereupon the data storage manager 1802 can provide the host 1806 with the new rule. If the data storage manager 1802 identifies an indication (e.g., via an exception received in a response from polling the host 1806 or as a result of receiving an API request from the host 1806 that indicates that the new rule is sought) from the host 1806 that the host 1806 seeks the new rule, the data storage manager 1802 may delay providing the new rule until it determines (e.g., receives a notification from a placement service that the data has been copied to the new location) that migration of the data from the old location to the new location is complete. Once the data has been migrated to the new location, the data storage manager 1802 may also update the read rule to point to the new location. In some embodiments, the data storage manager 1802 may send the rule invalidation notice 1808 to invalidate the old read rule at the host 1806, and provide the host 1806 with the new read rule if the host indicates (e.g., raises an exception) that it seeks the new read rule. In other embodiments, rather than invalidating the old read rule, the data storage manager 1802 may instead provide the host 1806 with the new read rule.

In alternative embodiments, the data storage manager 1802 does not always invalidate the old rule during data migration by the placement service 1834, but instead data written to the old location are written to write-back cache so as to allow the write to succeed during the copy operation. In other words, the placement service 1834 takes notice of the write to the old location, allowing the write to proceed while copying the data around the write. Upon completion of the write, the placement service 1834 may perform "catch-up" replication (e.g., lazy write) to the new locations for the write(s) performed to the old location(s). In this manner, the data is copied from the old location to the new location, and, once copied, the placement service 1834 looks to see if writes have occurred to the old location and backfills the copy to the new location with the writes without invalidating rules to the old location until the data is fully copied and up-to-date.

In some embodiments, the placement service 1834 copies blocks from the first storage node 1810A to the second storage node 1810B as part of a process for snapshotting the volume. That is, the placement service 1834 copies the blocks of the volume to new locations, preserving the old blocks in their old locations as a snapshot of the volume prior to the copy. In this manner, the volume can be restored to a previous state simply by updating the set of rules for the volume to point to the locations of the old blocks.

The data storage manager may determine that the data has been fully migrated to the new storage location in a variety of ways, such as by receiving notification from the placement service 1834 that migration is complete or by sending a query (e.g., API call) to the placement service and receiving a response that indicates the status of the data relocation. This set of actions may be implemented as a blocking atomic commit; that is, the set of actions may be implemented as an operation that succeeds if all of the actions succeed, but if any of the actions fails, all of the actions in the atomic commit should be reversed to ensure that the system remains in a consistent state.

The rule invalidation notice 1808 may be a set of rules indicating that certain rules in a local copy of the set of rules accessible to the host 1806 are obsolete and are not to be used (i.e., invalid rules). The rule invalidation notice 1808 may indicate this by pushing a set of rules to the host 1806 to replace its local set of rules that does not contain entries for the invalid rules; in this manner, if the host attempts to locate a rule that has been invalidated in its local set of rules (e.g., for a storage location that is been moved), it may alert the data storage manager that it needs a new set of rules containing the rule sought. Alternatively, in some implementations the rule invalidation notice 1808 may contain updated rules to replace the invalid rules. Still alternatively, in some implementations the rule invalidation notice 1808 may contain identifiers for the invalid rules and an indication that they are invalid, thereby causing the host 1806 to flag the rules as invalid (i.e., modifying an entry for the particular rule to include a value that indicates the particular rule is invalid), and request an updated set of rules if a sought rule has been invalidated.

As an example of the use of rule invalidation, a customer initiates capturing a snapshot of a volume comprising a plurality of nodes. Because an I/O operation performed to the volume during the snapshot capture, especially a write operation, could corrupt the snapshot, some or all I/O operations directed to the volume may be redirected to a different location. As a result, the set of rules for the volume with the host 1806 should be invalidated and replaced with a set of rules corresponding to the new location. Thus, in this example, initiating capture of the snapshot causes a data control plane to determine a new addressable resource pool as an alternate location for I/O operations of the volume. The data control plane provides this new addressable resource pool to the data storage manager 1802. In this case, in FIG. 18 the rule invalidation notice 1808 sent by the data storage manager 1802 is a replacement set of rules for the volume being snapshotted. As an alternative, the set of rules for the volume with the host 1806 can be invalidated such that an attempt to perform an I/O operation to the volume being snapshotted causes the host 1806 to raise an exception. In this alternative embodiment, the data storage manager 1802 notifies the host to invalidate the rules for the volume. An updated set of rules for the volume may be provided to the host 1806 by the data storage manager 1802 in response to the host 1806 raising an exception.

Likewise, the volume may be mirrored block by block to different storage nodes, for example, as a proactive move to move data from an older hard drive to a newer hard drive to mitigate potential failure of older hardware. As each block is flagged for migration, the data storage manager 1802 may send a rule invalidation notice 1808 to the host for that block and provide an updated rule to the host that directs the host to a new location after the block has been migrated to the new location. This prevents the host from writing to the old location during or after the migration, while still leaving other blocks of the volume writable at their old location if migration has not yet begun for those other blocks. In some embodiments where read rules are separate from write rules, the read rules may include duplicate read rules; that is, a read rule to the old location and a read rule to the new location. The new read rule may be provided by the data storage manager 1802 as soon as the new location is determined. If the host seeks to read from a block, the host may utilize the new read rule to read from the new location. However, if the new location does not contain the data sought (e.g., data migration is not yet complete), the host may refer to the old rule in an attempt to read from the old location. In some implementations, the old read rule may be invalidated once migration for the block is complete. Once the volume is fully migrated to the new location, the blocks at the old location may be erased/unallocated as desired and/or made available for associating with a new or different volume.

Figure 19:
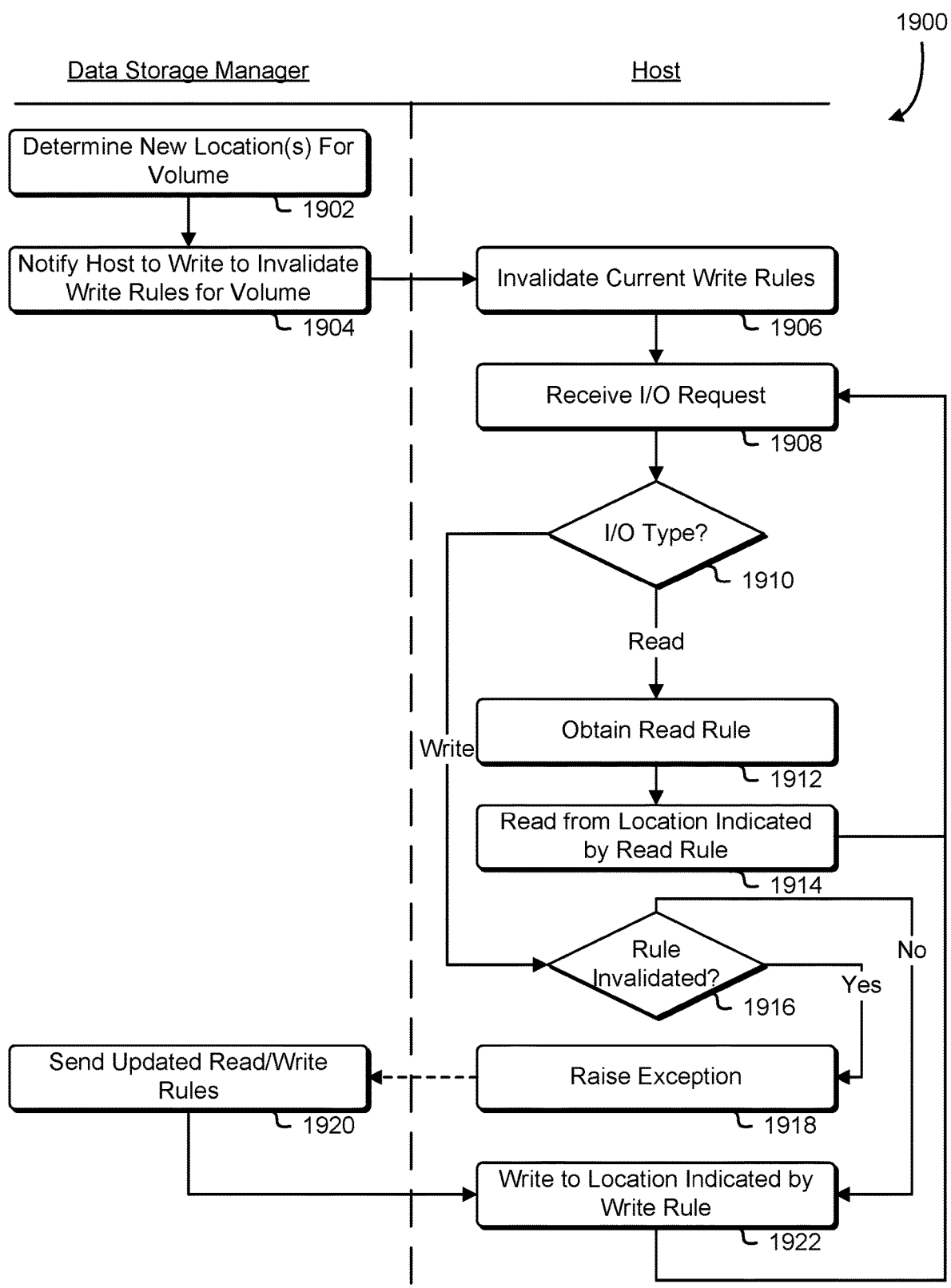
FIG. 19 is a swim diagram that illustrates an example of rule invalidation in accordance with an embodiment.

FIG. 19 is a flowchart illustrating an example of a process 1900 for invalidating rules in accordance with various embodiments. Some or all of the process 1900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1900 may be performed by any suitable system, such as a server in a data center, by various components of the environment 2000 described in conjunction with FIG. 20, such as the web server 2006 or the application server 2008, by multiple computing devices in a distributed system of a computing resource service provider, or by any electronic client device such as the electronic client device 2002. The process 1900 includes a series of operations performed after blocks of the volume have been moved, such as by a placement service, wherein a data storage manager determines what the new locations of the blocks are and notifies the host(s) having rules for the volume to invalidate the write rules. The host invalidates the write rules in its local copy of the set of rules for the volume, and upon receiving an I/O request either obtains new rules or not dependent on the type of I/O operation requested.

In 1902, the data storage manager determines what the new locations of the blocks are. For example, the blocks may have been moved by a placement service, which notifies a data control plane of the rearrangement of blocks. Reasons for movement of the blocks include taking a snapshot of the volume, data migration from a server having a risk of failure above a threshold, data migration to a faster server, or a change in block size.

In 1904, the data storage manager notifies the host that rules corresponding to previous locations of blocks of the volume should not be written to. It must be noted that in some embodiments this notification may also include a prohibition on reading from blocks of the old volume (e.g., blocks at the old locations may be at risk of being out of date, blocks may no longer exist at old locations due to hardware failure, etc.). In some embodiments, the notification may include a set of rules pointing to the new location for the blocks, whereas in other embodiments, the notification only specifies that the host is to invalidate the obsolete rules.

In 1906, the host may invalidate (or in some embodiments replace) the write rules corresponding to the old locations of the blocks. In 1908, the host receives a request, such as from a virtual machine instance running on the host, to perform an I/O operation to a block of the volume. In 1910, the host determines the applicable rule sought to fulfill the I/O request in 1910. In some implementations, there may be separate rules for reading versus writing. That is, if data stored at an old location has not changed, it may be acceptable to read from the old location. On the other hand, if the data has changed, it is preferable for the data to be read from the new location. Thus, if the I/O operation is a read operation, the host performing the process 1900 may proceed to 1912. On the other hand, if the I/O operation is a write operation, the host may proceed to 1916. In some implementations, however, the rules in the set of rules for reading and writing may be the same; in such implementations, the operations of 1910-14 may not exist, and the host would proceed directly to 1916 from 1908.

In 1912, the host obtains the read rule from the set of rules. It must be noted, however, that if the read rule for the particular block of the volume is not present in the local set of rules, the host may raise the exception as described for the process 800 of FIG. 8. In 1914, having obtained the read rule, the host may cause the read I/O operation to be performed (e.g., by forwarding the I/O request to the storage device/server at the location specified in the corresponding read rule).

However, if the I/O operation is a write operation, in 1916, the host may determine whether a valid rule resides in its set of rules. If the applicable write rule has been invalidated, the host may proceed to 1918, whereupon it raises an exception indicating that it seeks an updated rule in order to perform the I/O operation. If, however, the write rule is located and valid within the set of rules, the host proceeds to 1922 to cause the I/O write operation to be performed.

As noted, if the rule has been invalidated, in 1918, the host may raise an exception as described in the present disclosure. In 1920 data storage manager receives an indication that the exception is raised (e.g., from a result of a long poll), and sends a set of updated rules that includes a rule corresponding to the requested I/O write operation at the new location down to the host. If the data storage manager has not yet generated the set of updated rules, the operations of 1920 may include generating the set of updated rules. Upon receiving the set of updated rules, the host may determine the appropriate rule for performing the requested I/O write operation and cause the write I/O operation to be performed in accordance with the updated rule (e.g., by sending a write command to the storage device at the location indicated by the updated rule). Note that one or more of the operations performed in 1902-22 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 20 illustrates aspects of an example environment 2000 for implementing aspects in accordance with various embodiments. As will be appreciated, although a web-based environment is used for purposes of explanation, different environments may be used, as appropriate, to implement various embodiments. The environment includes an electronic client device 2002, which can include any appropriate device operable to send and/or receive requests, messages, or information over an appropriate network 2004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 2004 can include any appropriate network, including an intranet, the Internet, a cellular network, a local area network, a satellite network or any other network and/or combination thereof. Components used for such a system can depend at least in part upon the type of network and/or environment selected. Many protocols and components for communicating via such a network are well known and will not be discussed in detail. Communication over the network 2004 can be enabled by wired or wireless connections and combinations thereof. In this example, the network 2004 includes the Internet and/or other publicly-addressable communications network, as the environment includes a web server 2006 for receiving requests and serving content in response thereto, although for other networks an alternative device serving a similar purpose could be used as would be apparent to one of ordinary skill in the art.

The illustrative environment includes an application server 2008 and a data store 2010. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 2008 can include any appropriate hardware, software and firmware for integrating with the data store 2010 as needed to execute aspects of one or more applications for the electronic client device 2002, handling some or all of the data access and business logic for an application. The application server 2008 may provide access control services in cooperation with the data store 2010 and is able to generate content including, text, graphics, audio, video and/or other content usable to be provided to the user, which may be served to the user by the web server 2006 in the form of HyperText Markup Language ("HTML"), Extensible Markup Language ("XML"), JavaScript, Cascading Style Sheets ("CS S"), JavaScript Object Notation (JSON), and/or another appropriate client-side structured language. Content transferred to a client device may be processed by the electronic client device 2002 to provide the content in one or more forms including, forms that are perceptible to the user audibly, visually and/or through other senses. The handling of all requests and responses, as well as the delivery of content between the electronic client device 2002 and the application server 2008, can be handled by the web server 2006 using PHP: Hypertext Preprocessor ("PHP"), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

The data store 2010 can include several separate data tables, databases, data documents, dynamic data storage schemes and/or other data storage mechanisms and media for storing data relating to a particular aspect of the present disclosure. For example, the data store 2010 may include mechanisms for storing production data 2012 and user information 2016, which can be used to serve content for the production side. The data store 2010 also is shown to include a mechanism for storing log data 2014, which can be used for reporting, analysis or other purposes. It should be understood that there can be many other aspects that may need to be stored in the data store 2010, such as page image information and access rights information, which can be stored in any of the above listed mechanisms as appropriate or in additional mechanisms in the data store 2010. The data store 2010 is operable, through logic associated therewith, to receive instructions from the application server 2008 and obtain, update or otherwise process data in response thereto. The application server 2008 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server 2008. In one example, a user, through a device operated by the user, might submit a search request for a certain type of item. In this case, the data store 2010 might access the user information 2016 to verify the identity of the user and can access the catalog detail information to obtain information about items of that type. The information then can be returned to the user, such as in a results listing on a web page that the user is able to view via a browser on the electronic client device 2002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction of the example environment 2000 in FIG. 20 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 2004 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 2004. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    obtaining, from a customer computing device, first information about a plurality of storage nodes in a storage system of a customer, the first information including addressable regions of storage space associated with a logical data storage volume;
    identifying, by a computing resource service provider, that the first information usable by the customer computing device to locate a storage destination of the logical data storage volume is unavailable, the computing resource service provider being located external to the storage system and the customer computing device, wherein identifying that the first information usable by the customer computing device is unavailable occurs based at least in part on a notification from the customer computing device including information indicating that the storage destination is sought to perform an input/output operation;
    deriving, by the computing resource service provider and from the first information, a table of second information that includes a mapping between a data block of the logical data storage volume and the storage destination in a storage node of the plurality of storage nodes; and
    enabling the customer computing device to determine the storage destination and perform the input/output operation to a data block located in the storage node at the storage destination by providing the table to the customer computing device.

2. The computer-implemented method of claim 1, wherein the first information is obtained from a software agent running in the storage system, the software agent provided to the customer by the computing resource service provider.

3. The computer-implemented method of claim 1, wherein:
    the table further includes a section for cryptographic information; and
    the customer computing device is further enabled to perform a cryptographic operation to data associated with the data block using the cryptographic information.

4. The computer-implemented method of claim 1, wherein obtaining the first information includes obtaining, by the computing resource service provider via a network, the first information from the customer computing device.

5. A system, comprising:
    one or more processors; and
    memory including instructions that, as a result of execution by the one or more processors, cause the system to:
        obtain, from a client computer system, first information about a plurality of storage nodes in a storage system that is external to an environment of a service provider that hosts the system, the first information including storage locations available for a storage volume;
        receive, at the service provider, notice that the first information usable to locate a storage destination for a block of the storage volume is unavailable to the client computer system, wherein the notice is received based at least in part on the client computer system failing to locate the storage destination for the block; and
        provide, by the service provider and in response to the received notice, second information that maps the block of the storage volume to the storage destination in a storage node of the plurality of storage nodes to enable the client computer system to perform a data operation to the block located in the storage node at the storage destination.

6. The system of claim 5, wherein:
    the instructions further include instructions that cause the system to:
        receive, from the client computer system, a request for creation of the storage volume; and
        submit, as a response to the request, a polling inquiry to the client computer system; and
    the notice is received in a response to the polling inquiry.

7. The system of claim 5, wherein:
    the second information further includes cryptographic information; and
    the data operation includes a cryptographic operation that is performed, using the cryptographic information, to data associated with the block.

8. The system of claim 5, wherein the instructions further include instructions that cause the system to encrypt the second information to form encrypted second information, the encrypted second information being decryptable using a cryptographic key held by the client computer system.

9. The system of claim 5, wherein the second information includes a plurality of storage destinations corresponding to a number of subsequent blocks of the storage volume from the block.

10. The system of claim 5, wherein the storage system is a storage-area network.

11. The system of claim 5, wherein:
the instructions further include instructions that cause the system to provide a software agent to a customer associated with the client computer system; and
the first information is obtained from the software agent that has been launched on a computing device that has access to the storage system.

12. The system of claim 5, wherein the notice that the first information usable to locate a storage destination for a block of the storage volume includes an indication of a portion of the storage volume including the block.

13. A non-transitory computer-readable storage medium comprising executable instructions that, as a result of being executed by one or more processors of a computer system, cause the computer system to at least:
send, to a control plane of a service provider, a request for creation of a volume;
attach the volume upon receipt of a notification from a data storage manager of the service provider that the volume is created;
provide, to the service provider, first information about regions of storage space in a storage environment available for the volume, the storage environment being external to the service provider;
notify the data storage manager running in a virtual machine instance hosted by the service provider, that the first information usable to locate a storage destination of a portion of the volume is unavailable to perform an input/output operation;
obtain, from the data storage manager and as a result of the first information being unavailable, second information that includes the storage destination in the storage environment; and
perform a data operation at the storage destination upon receipt of a notification from the data storage manager that the volume is available, the storage destination determined based at least in part from the second information.

14. The non-transitory computer-readable storage medium of claim 13, wherein the executable instructions that cause the computer system to notify the service provider include executable instructions that cause the computer system to raise, based at least in part on a failed attempt to perform the data operation, an exception.

15. The non-transitory computer-readable storage medium of claim 14, wherein the exception includes an indication of the portion of the volume for which the storage destination is sought.

16. The non-transitory computer-readable storage medium of claim 14, wherein the executable instructions that raise the exception include instructions that cause the computer system to provide the exception as a response to a polling inquiry by the service provider.

17. The non-transitory computer-readable storage medium of claim 13, wherein the second information that includes the storage destination is second information that includes an offset range within the volume mapped to an Internet Protocol address of a storage device in the storage environment.

18. The non-transitory computer-readable storage medium of claim 13, wherein the data operation involves performing a cryptographic operation, using a cryptographic key that is inaccessible to the service provider, to data associated with the storage destination.

19. The non-transitory computer-readable storage medium of claim 13, wherein the second information includes a mapping between a data block of the volume and the storage destination in a storage node of a plurality of storage nodes.

20. The non-transitory computer-readable storage medium of claim 13, wherein the second information includes one or more rules, wherein the one or more rules indicate when the second information becomes invalid to perform the data operation at the storage destination.

* * * * *